United States Patent
Oda et al.

(10) Patent No.: US 10,158,422 B2
(45) Date of Patent: Dec. 18, 2018

(54) APPARATUS AND METHOD FOR ESTIMATING OPTICAL TRANSMISSION PERFORMANCE

(71) Applicant: FUJITSU LIMITED, Kawasaki-shi, Kanagawa (JP)

(72) Inventors: Shoichiro Oda, Fuchu (JP); Masatake Miyabe, Kawasaki (JP); Setsuo Yoshida, Inagi (JP); Yasuhiko Aoki, Yokohama (JP); Toru Katagiri, Kawasaki (JP); Goji Nakagawa, Sagamihara (JP); Shigeru Ishii, Ota (JP); Yutaka Takita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/489,836

(22) Filed: Apr. 18, 2017

(65) Prior Publication Data
US 2017/0310391 A1  Oct. 26, 2017

(30) Foreign Application Priority Data

Apr. 20, 2016 (JP) .................... 2016-084746
Jan. 31, 2017 (JP) .................... 2017-015387

(51) Int. Cl.
*H04B 10/08* (2006.01)
*H04B 10/079* (2013.01)
*H04J 14/02* (2006.01)

(52) U.S. Cl.
CPC ...... *H04B 10/0795* (2013.01); *H04J 14/0201* (2013.01)

(58) Field of Classification Search
CPC .......... H04B 10/0795; H04B 10/07953; H04B 10/07957; H04B 10/0793; H04Q 11/0066;
(Continued)

(56) References Cited

U.S. PATENT DOCUMENTS

2010/0142943 A1  6/2010  Frankel et al.
2012/0251103 A1*  10/2012  Solheim .............. H04J 14/0283
                                                       398/34
(Continued)

FOREIGN PATENT DOCUMENTS

JP  2007-60088  3/2007
JP  2010-81297  4/2010
(Continued)

*Primary Examiner* — Hanh Phan
(74) *Attorney, Agent, or Firm* — Staas & Halsey LLP

(57) ABSTRACT

There is provided an apparatus configured to estimate optical transmission performance in a transmission path of an optical signal, the apparatus including a memory, and a processor coupled to the memory and the processor configured to acquire a first index related to a first transmission performance of an optical signal transmitted through a span group between a first node and an n-th node and a second index related to a second transmission performance of an optical signal transmitted through a span or a span group between the first node and an m-th node, wherein n is an integer of 3 or more, and m is the integer satisfying m<n, and estimate a third index related to a third transmission performance of an optical signal to be transmitted through a span between the m-th node and the n-th node, based on the first index and the second index.

18 Claims, 27 Drawing Sheets

(58) Field of Classification Search
CPC . H04Q 11/0062; H04Q 11/0005; H04J 14/02; H04J 14/0268; H04J 14/0269; H04L 45/62
USPC ........ 398/25, 26, 27, 33, 34, 38, 79, 45, 48, 398/49, 51, 54, 57, 58, 59, 83, 158, 159; 370/351, 352, 389, 392, 468, 254
See application file for complete search history.

(56) References Cited

U.S. PATENT DOCUMENTS

| | | |
|---|---|---|
| 2013/0236169 A1 | 9/2013 | Gaudette et al. |
| 2014/0328587 A1* | 11/2014 | Magri ..................... H04L 45/62 398/26 |
| 2015/0055953 A1* | 2/2015 | Guy ................... H04J 14/0246 398/48 |

FOREIGN PATENT DOCUMENTS

| | | |
|---|---|---|
| JP | 2012-15966 | 1/2012 |
| JP | 2014-165818 | 9/2014 |

* cited by examiner

FIG.9

| SPAN | #1 | #2 | #3 | ... | #N-1 |
|---|---|---|---|---|---|
| TRANSMISSION QUALITY AMOUNT | $F_1$ | $F_2$ | $F_3$ | ... | $F_{N-1}$ |

| SPAN | #1 | #2 | #3 | #4 | ... | #N-1 |
|---|---|---|---|---|---|---|
| TRANSMISSION QUALITY AMOUNT (SMALL SPAN) | $F_{x1}$ | $F_{x2}$ | $F_{x3}$ | $F_{x4}$ | ... | $F_{xN-1}$ |
| TRANSMISSION QUALITY AMOUNT (LARGE SPAN) | $F_{y1}$ | $F_{y2}$ | $F_{y3}$ | $F_{y4}$ | ... | $F_{yN-1}$ |

1213

FIG.27
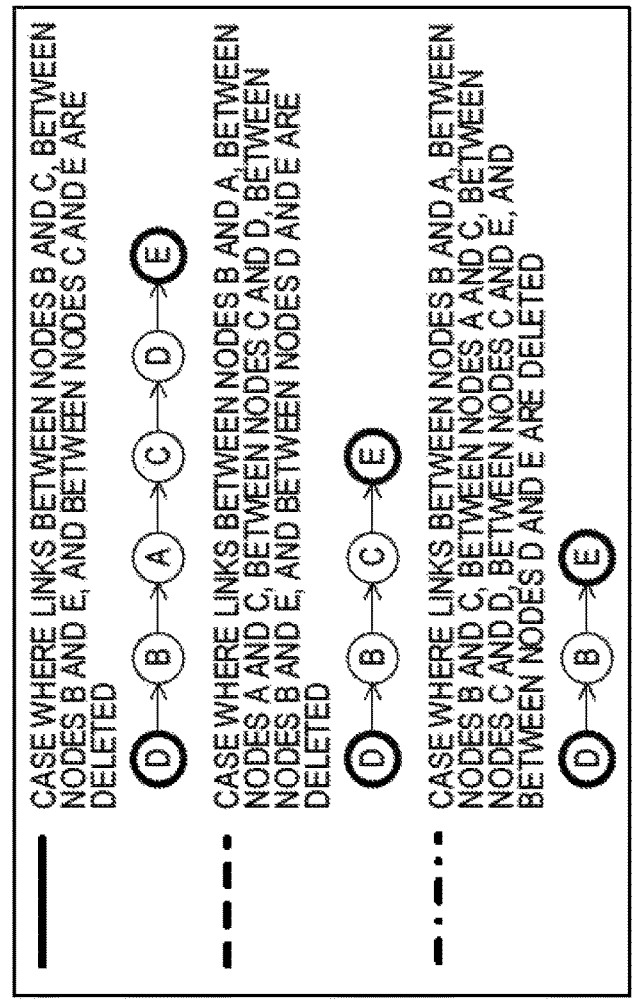
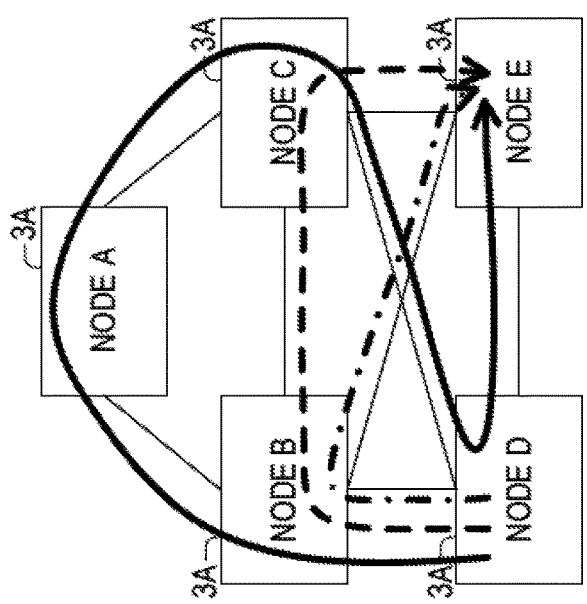

APPARATUS AND METHOD FOR ESTIMATING OPTICAL TRANSMISSION PERFORMANCE

CROSS-REFERENCE TO RELATED APPLICATIONS

This application is based upon and claims the benefit of priority of the prior Japanese Patent Application No. 2016-084746, filed on Apr. 20, 2016, and Japanese Patent Application No. 2017-015387, filed on Jan. 31, 2017, the entire contents of which are incorporated herein by reference.

FIELD

The embodiments discussed herein are related to an apparatus and a method for estimating optical transmission performance.

BACKGROUND

An optical communication system may be designed on the basis of previously given system conditions before the provision of a communication service. Since actual parameters cannot be measured before the provision of the communication service, the optical communication system may be designed using parameter values estimated with a margin.

Related technologies are disclosed in, for example, Japanese Laid-Open Patent Publication No. 2012-015966, Japanese Laid-Open Patent Publication No. 2010-081297, U.S. Patent Application Publication No. 2010/0142943, U.S. Patent Application Publication No. 2013/0236169, Japanese Laid-Open Patent Publication No. 2007-060088, and Japanese Laid-Open Patent Publication No. 2014-165818.

SUMMARY

According to an aspect of the invention, an apparatus configured to estimate optical transmission performance in a transmission path of an optical signal in a network formed by a plurality of nodes, the apparatus includes a memory, and a processor coupled to the memory and the processor configured to acquire a first index related to a first transmission performance of an optical signal transmitted through a span group between a first node and an n-th node and a second index related to a second transmission performance of an optical signal transmitted through a span or a span group between the first node and an m-th node, wherein n is an integer of 3 or more, and m is the integer satisfying m<n, and estimate a third index related to a third transmission performance of an optical signal to be transmitted through a span between the m-th node and the n-th node, based on the first index and the second index.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a table illustrating an example of transmission quality amount information in the optical communication system illustrated in FIG. 5;

FIG. 14 is a table illustrating an example of transmission quality amount information in an optical communication system according to a fourth modification of the first embodiment;

FIG. 27 is a view illustrating an example of a determined path in a modification of the second embodiment.

DESCRIPTION OF EMBODIMENTS

Figure 1:
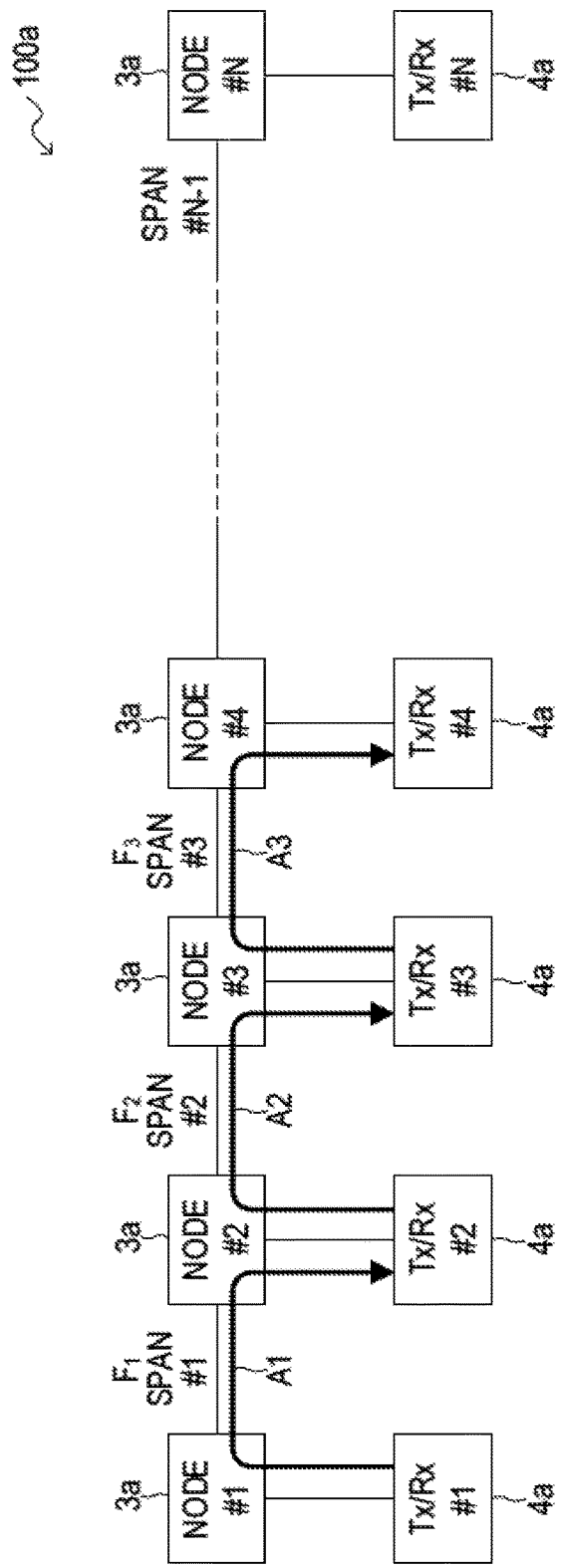
FIG. 1 is a view illustrating an example of estimation of transmission performance in an optical communication system.

In the design of an optical communication system, it is difficult to set an appropriate margin. For example, when an excessive margin is input, a design value providing performance worse than an actual performance may be output, and a distance by which an optical signal is determined to be transmitted may be shorter than the actual distance.

Embodiments of a technique for improving the accuracy of estimation of optical transmission performance will now be described with reference to the accompanying drawings. However, it is to be noted that the following embodiments are just illustrative and are not intended to exclude the application of various modifications and techniques not explicitly described in the embodiments. For example, the present embodiments may be carried out with various modifications without departing from the spirit and scope of the present disclosure.

In addition, the drawings are intended to include not only the constituent elements illustrated but also other constituent elements not illustrated. Throughout the drawings, the same reference numerals denote the same or similar elements or parts unless otherwise specified.

[A] First Embodiment

[A-1] Exemplary System Configuration

FIG. 1 is a view illustrating an example of estimation of transmission performance in an optical communication system 100a.

In the optical communication system 100a illustrated in FIG. 1, similarly to an optical communication system 100 of a first embodiment to be described later with reference to FIG. 5, nodes 3a may be connected in a mesh shape. That is, one of a plurality of routes constituted by a plurality of nodes 3a connected in a mesh shape is illustrated in FIG. 1.

As illustrated in FIG. 1, the optical communication system 100a includes a plurality of nodes 3a (N nodes in this illustrated example) indicated as nodes #1 to #N.

In FIG. 1, for the sake of explanation, a transceiver 4a (indicated as "Tx/Rx #1 to #N") provided for each node 3a is illustrated independently of the node 3a. In the example illustrated in FIG. 1, the Tx/Rxs #1 to #N may be provided for the respective nodes #1 to #N.

The nodes 3a may be connected so as to communicate with each other by, for example, an optical fiber transmission line. A transmission section between one node 3a and another may be referred to as a "span." In the example illustrated in FIG. 1, a transmission section between the node #1 and the node #2 is referred to as a span #1, a transmission section between the node #2 and the node #3 is referred to as a span #2, and a transmission section between the node #3 and the node #4 is referred to as a span #3. A transmission section between the node #N−1 (not illustrated in FIG. 1) and the node #N is referred to as a span #N−1.

In the optical communication system 100a illustrated in FIG. 1, for example, the transmission quality amount F between one node 3a and an adjacent node 3a (in other words, in "1 span") is measured.

For example, when an optical signal is transmitted from the Tx/Rx #1 of the node #1 to the Tx/Rx #2 of the node #2, the transmission quality amount F1 of the span #1 may be measured (see reference symbol A1). In addition, when an optical signal is transmitted from the Tx/Rx #2 of the node #2 to the Tx/Rx #3 of the node #3, the transmission quality amount F2 of the span #2 may be measured (see reference symbol A2). Further, when an optical signal is transmitted from the Tx/Rx #3 of the node #3 to the Tx/Rx #4 of the node #4, the transmission quality amount F3 of the span #3 may be measured (see reference symbol A3).

The transmission quality amount F may be, for example, an optical signal-to-noise ratio (OSNR). In the following description, it is assumed that the transmission quality amount F is OSNR. As will be described later, the transmission quality amount F may be indicated by an index other than OSNR.

When the scheme of optical signal transmission between the nodes 3a is DP-QPSK, the transmission quality amount F may be calculated from a bit error rate (BER) measured in each span, based on the following equation (1). DP-QPSK is an abbreviation of dual polarization-quadrature phase shift keying.

[Eq. 1]

$$F = (\text{erfc}^{-1}(2BER))^2 \cdot \frac{2Rs}{Bn} \tag{1}$$

In the equation (1), Bn is a noise bandwidth, and Rs is a signal baud rate.

Since the transmission quality amount F (in this case, OSNR) calculated from the BER is in proportion to a signal to noise ratio (SNR), the transmission quality amount F (for example, $F_{1 \to 4}$) in a certain section (for example, a section from the node #1 to the node #4) may be calculated based on the following equation (2).

[Eq. 2]

$$F_{1 \to 4} = (F_1^{-1} + F_2^{-1} + F_3^{-1})^{-1} \tag{2}$$

Figure 2:
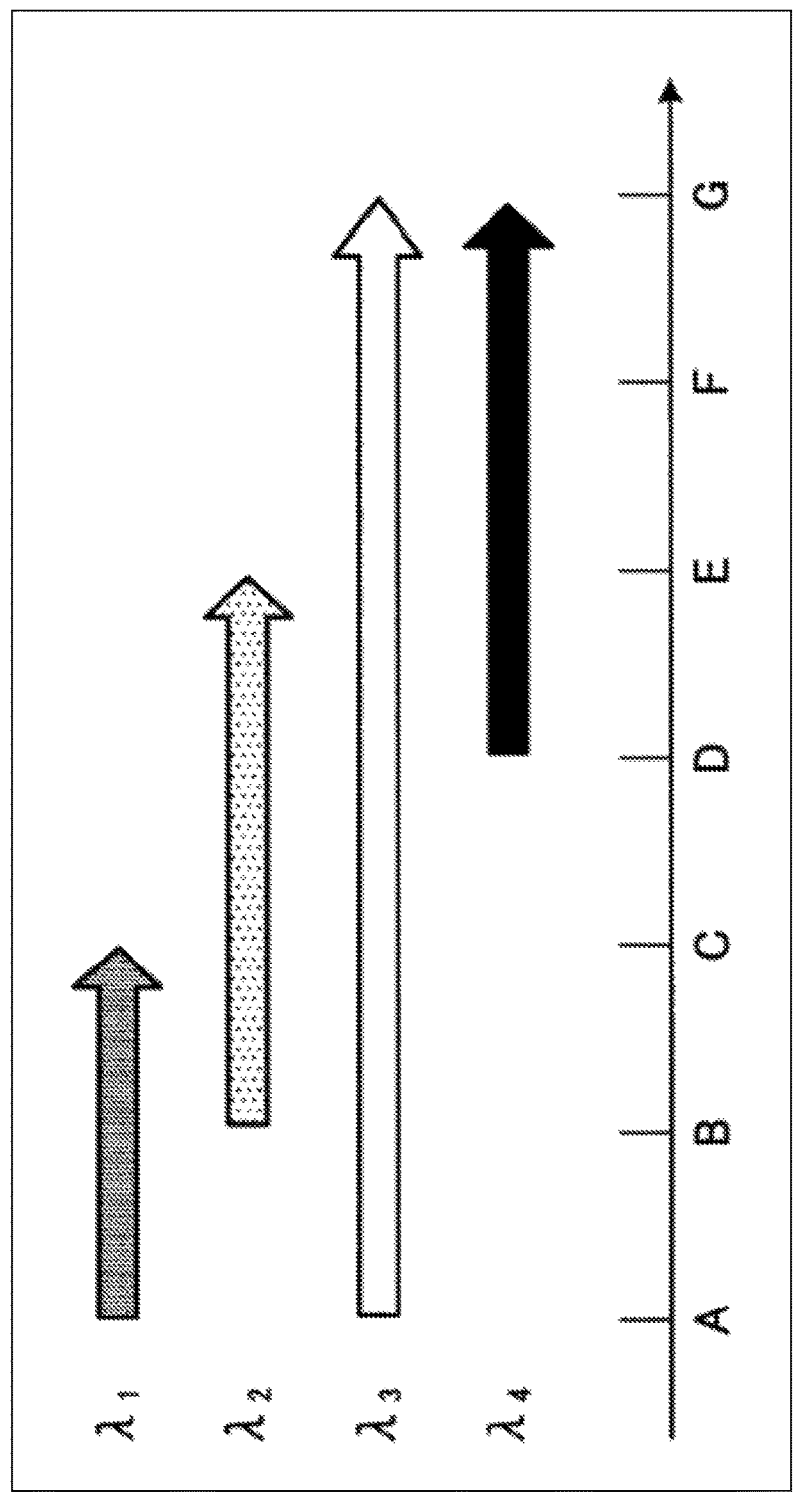
FIG. 2 is a view illustrating an example of wavelength paths in the optical communication system illustrated in FIG. 1.

FIG. 2 is a view illustrating an example of wavelength paths in the optical communication system 100a illustrated in FIG. 1.

As illustrated in FIG. 2, a wavelength path λ1 may be composed of spans A-B and B-C, and a wavelength path λ2 may be composed of spans B-C, C-D, and D-E. In addition, a wavelength path λ3 may be composed of spans A-B, B-C, C-D, D-E, E-F, and F-G. Further, a wavelength path λ4 may be composed of spans D-E, E-F, and F-G.

The wavelength paths λ1, λ2, and λ4 may be wavelength paths under operation, and the wavelength path λ3 may be a wavelength path of an estimation target of OSNR.

Figure 3:
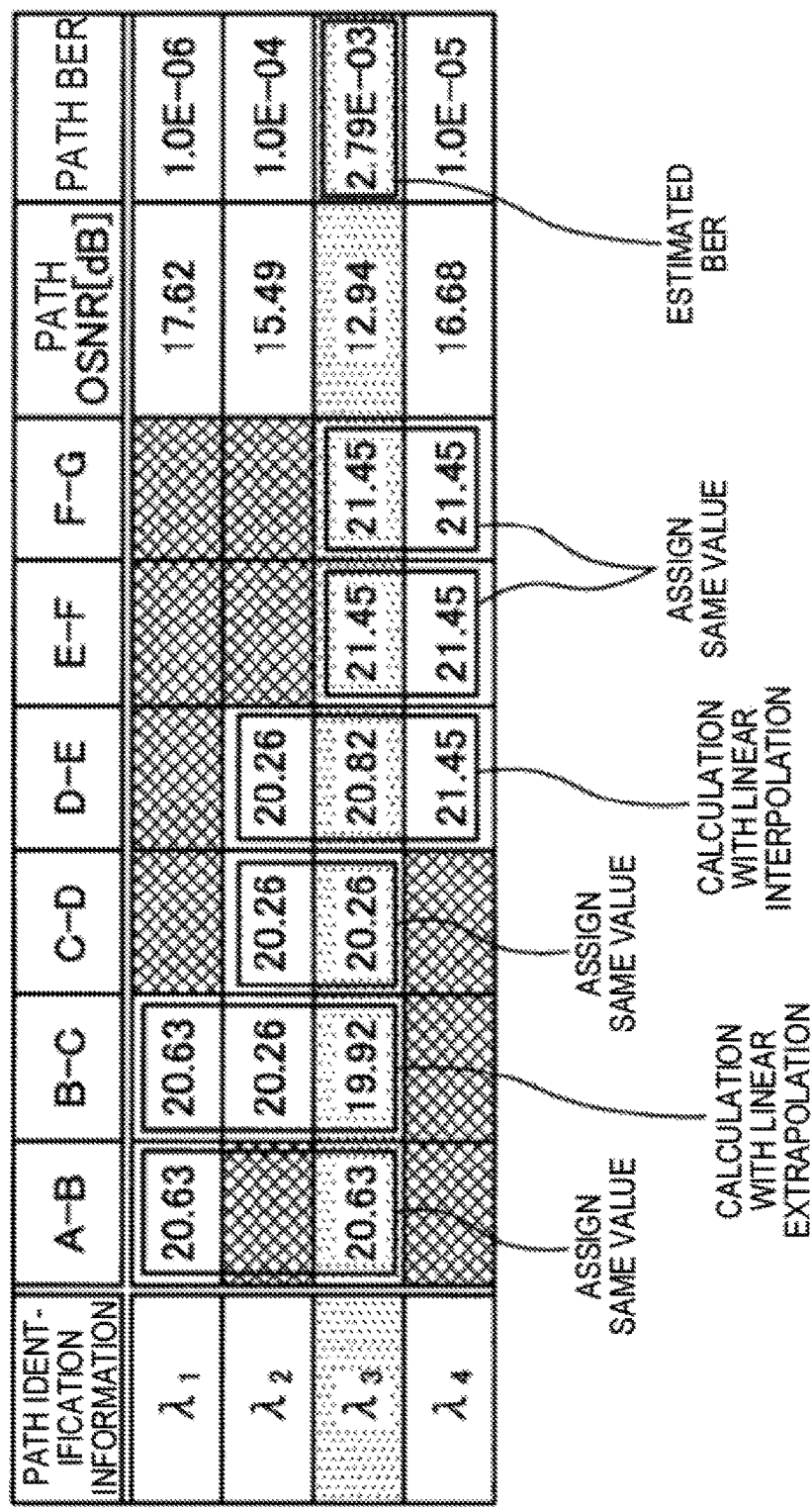
FIG. 3 is a table illustrating an example of a transmission quality amount in the optical communication system illustrated in FIG. 1.

FIG. 3 is a table illustrating an example of a transmission quality amount (in other words, "OSNR") in the optical communication system 100a illustrated in FIG. 1.

The OSNR of each span within the wavelength path λ3 of the estimation may be calculated based on OSNR of each span in the other wavelength paths.

For example, the OSNR of the span A-B in the wavelength path λ3 of the estimation target may be calculated based on the OSNR of the span A-B in the wavelength path λ1. In this case, since there is one OSNR of the same span as the span A-B in the wavelength path λ3 in the table of FIG. 3, the OSNR of the span A-B within the wavelength path λ1 may be assigned to the OSNR of the span A-B of the wavelength path λ3.

The OSNR of the span B-C in the wavelength path λ3 may be calculated based on the OSNR of the same span B-C in the wavelength path λ1 and the wavelength path λ2. In this case, the table of FIG. 3 shows that there are two (in other words, "plural") OSNRs of the same span as the span B-C in the wavelength path λ3, and there is no wavelength of the wavelength path λ3 between the wavelength paths λ1 and λ2. Therefore, the OSNR of the same span of the wavelength path λ3 may be calculated by linear extrapolation of the OSNR of the span B-C of the wavelength paths λ1 and λ2.

Since there is one OSNR of the same span as the span C-D in the wavelength path λ3 in the table of FIG. 3, the OSNR of the span C-D of the wavelength path λ2 may be assigned to the OSNR of the span C-D of the wavelength path λ3.

The OSNR of the span D-E in the wavelength path λ3 may be calculated based on the OSNR of the same span D-E in the wavelength paths λ2 and λ4. In this case, the table of FIG. 3 shows that there are two (in other words, "plural") OSNRs of the same span as the span D-E in the wavelength path λ3, and there is the wavelength of the wavelength path λ3 between the wavelength paths λ2 and λ4. Therefore, the OSNR of the same span D-E in the wavelength path λ3 may be calculated by the linear interpolation of the OSNR of the span D-E in the wavelength paths λ2 and λ4.

Since there is one OSNR of the same span as the span E-F in the wavelength path λ3 in the table of FIG. 3, the OSNR of the span E-F in the wavelength path λ4 may be assigned to the OSNR of the span E-F of the wavelength path λ3.

Since there is one OSNR of the same span as the span F-G of the wavelength path λ3 in the table of FIG. 3, the OSNR of the span F-G in the wavelength path λ4 may be assigned to the OSNR of the span F-G of the wavelength path λ3.

Then, based on the OSNR of each span in the wavelength path λ3 of the estimation target of the table of FIG. 3, a path OSNR may be calculated using the following equation (3).

[Eq. 3]

$$\text{Path OSNR} = (\text{OSNR1}^{-1} + \text{OSNR2}^{-1} + \ldots)^{-1} = (k \cdot \text{OSNR}^{-1})^{-1} = k \text{OSNR} \quad (3)$$

In the equation (3), k is the number of spans included in a wavelength path of the estimation target.

Figure 4:
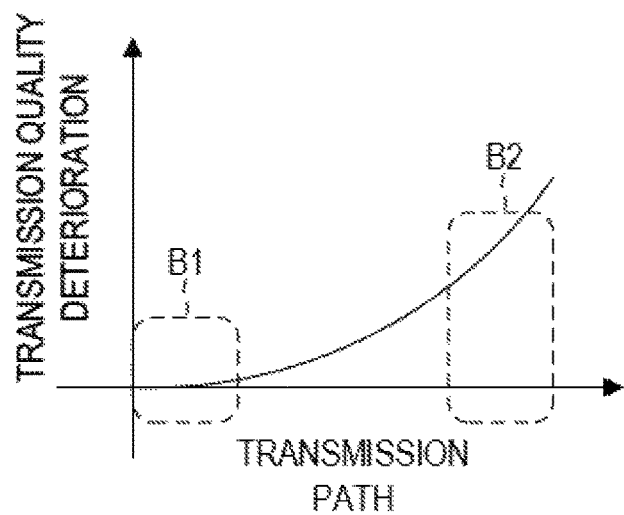
FIG. 4 is a graphical view illustrating an example of transmission quality deterioration in the optical communication system illustrated in FIG. 1.

FIG. 4 is a view illustrating an example of transmission quality deterioration in the optical communication system 100a illustrated in FIG. 1.

The deterioration amount $F_{SPAN}$ due to the transmission of an optical signal in one span hardly includes signal quality deterioration due to nonlinearity and signal quality deterioration due to band narrowing when the optical signal passes through an optical filter.

In other words, as illustrated in FIG. 4, the smaller the number of spans in which the optical signal is transmitted, the smaller the change in transmission quality deterioration amount is (see reference symbol B1). Meanwhile, the larger the number of spans in which the optical signal is transmitted, the larger the change in the transmission quality deterioration amount is (see reference symbol B2).

Therefore, when estimating the transmission quality amount when an optical signal is transmitted in multiple spans from the deterioration amount $F_{SPAN}$ when the optical signal is transmitted in one span, there is a high possibility of increase in estimation error.

Therefore, in order to improve the estimation accuracy of the transmission performance, the optical communication system 100 according to the first embodiment may have the following functional configurations.

Figure 5:
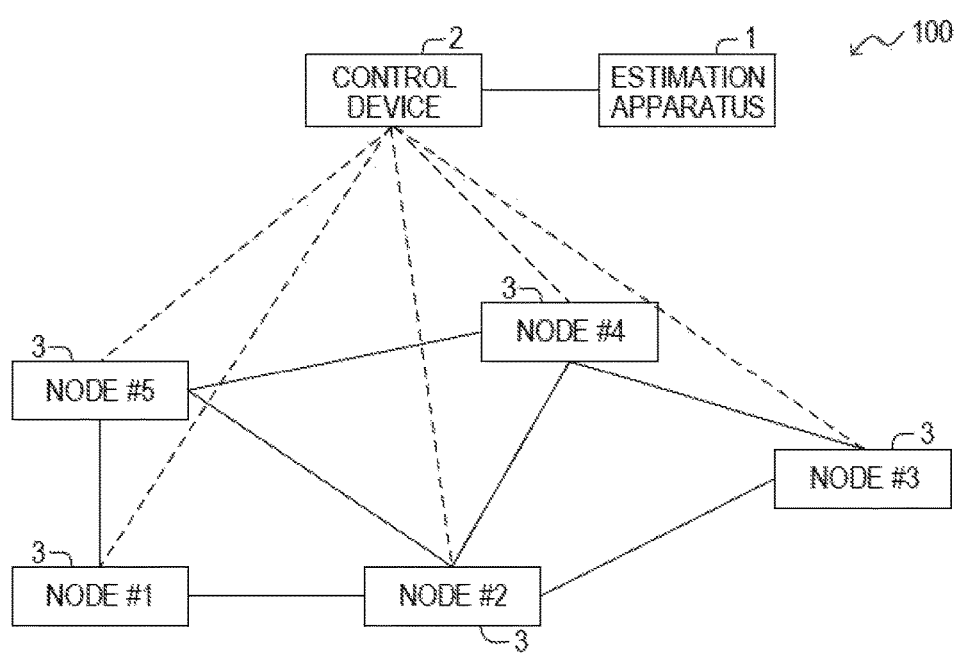
FIG. 5 is a block diagram illustrating an exemplary configuration of an optical communication system according to a first embodiment.

FIG. 5 is a block diagram illustrating an exemplary configuration of the optical communication system 100 according to the first embodiment.

As illustrated in FIG. 5, the optical communication system 100 illustratively includes an estimation apparatus 1, a control device 2, and a plurality of nodes 3 (five nodes 3 in this illustrated example) indicated as nodes #1 to #5. The function as the estimation apparatus 1 may be included in the control device 2.

The control device 2 is an example of a network control device and illustratively controls the transmission of optical signals by each node 3 included in the network. The control device 2 may be communicably connected to the estimation apparatus 1 and each node 3.

Further, the control device 2 inquires of the estimation apparatus 1 whether or not an optical signal may be transmitted from the start point node 3 to the end point node 3 of a certain path (which may be referred to as a "section" or "span group"). The start point node 3 may be a node 3 serving as the source of the optical signal and the end point node 3 may be a node 3 serving as the destination of the optical signal.

The node 3 illustratively exchanges optical signals with other nodes 3 via a span. Each node 3 may be connected to all or some of the other nodes 3 included in the optical communication system 100 so as to be able to communicate with each other via a span. In addition, each node 3 may exchange optical signals with other unconnected nodes 3 via other connected nodes 3.

In the example illustrated in FIG. 5, the node #1 is connected to nodes #2 and #5, the node #2 is connected to the nodes #1 and #3 to #5, and the node #3 is connected to the nodes #2 and #4. Further, the node #4 is connected to the nodes #2, #3, and #5, and the node #5 is connected to the nodes #1, #2, and #4.

Figure 6:
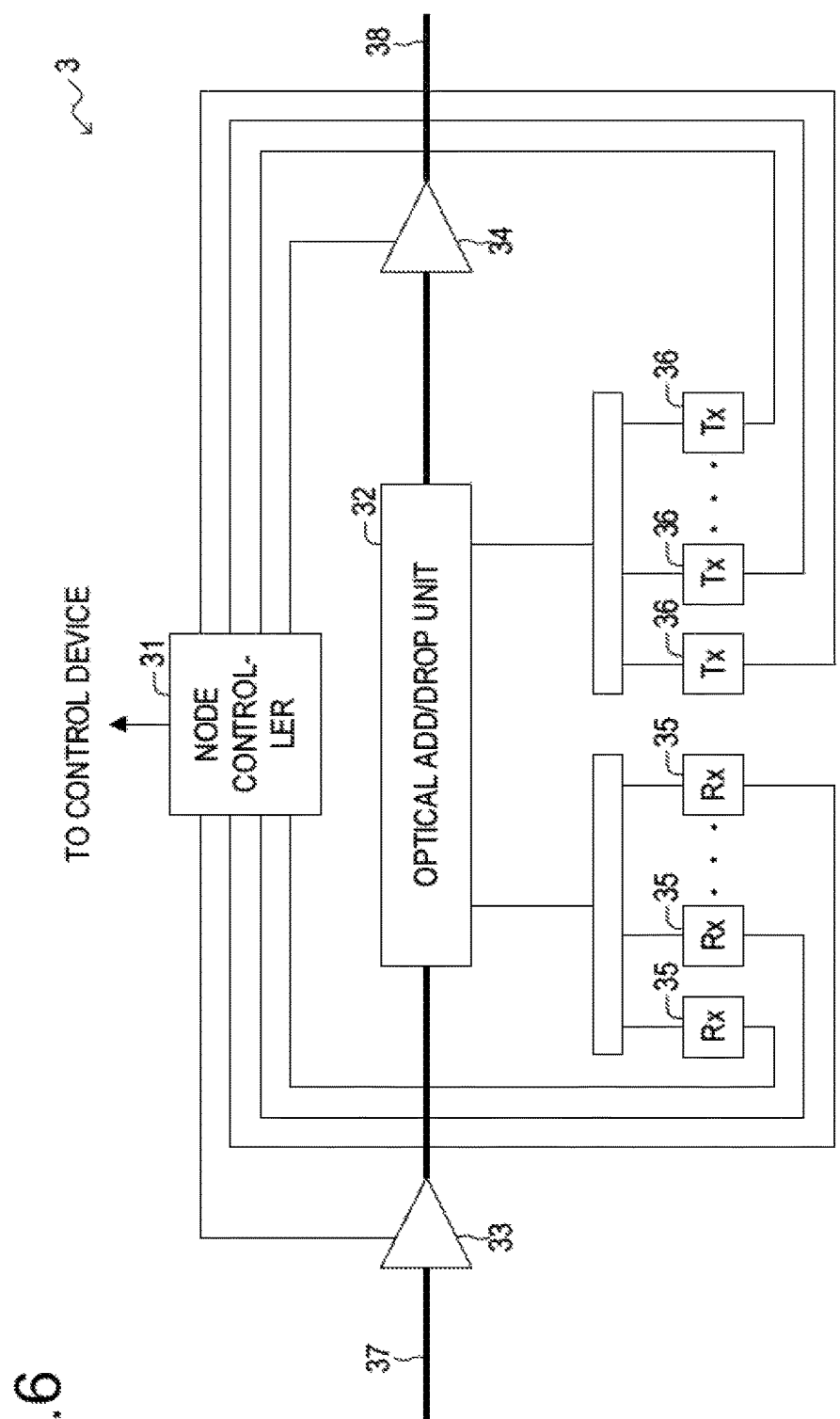
FIG. 6 is a block diagram illustrating an exemplary configuration of a node in the optical communication system illustrated in FIG. 5.

FIG. 6 is a block diagram illustrating an exemplary configuration of a node 3 in the optical communication system 100 illustrated in FIG. 5.

As illustrated in FIG. 6, the node 3 illustratively includes a node controller 31, an optical add/drop unit 32, an input amplifier 33, an output amplifier 34, a plurality of receiving units 35 indicated as Rx, and a plurality of transmitting units 36 indicated as Tx.

The input amplifier 33 illustratively amplifies an optical signal input from an optical fiber 37. The output amplifier 34 illustratively amplifies an optical signal to be output to an optical fiber 38.

The Rx 35 illustratively receives an optical signal. The Tx 36 illustratively transmits an optical signal.

Illustratively, the optical add/drop unit 32 has a function of optically dropping a part of an optical signal propagating through a wavelength path and optically adding a new optical signal to the optical signal propagating through the wavelength path and a function of adjusting the power of the optical signal propagating through the wavelength path. The optical add/drop unit 32 may optically drop an optical signal and transmit the optically-dropped optical signal to one of the Rxs 35. In addition, the optical add/drop unit 32 may optically add an optical signal from the Tx 36 to the optical signal and output the optically-added optical signal to the optical fiber 38 via the output amplifier 34. An example of the optical add/drop unit 32 may include an optical add/drop device such as an optical add-drop multiplexer (OADM).

Illustratively, the node controller 31 controls the optical add/drop unit 32, the input amplifier 33, and the output amplifier 34. In addition, the node controller 31 may be communicably connected to the control device 2 and may cause the Rx 35 to measure the BER of a wavelength path and notify the control device 2 of information including a result of the measurement of the BER. Further, the information notified to the control device 2 may include path identification information for identifying a wavelength path, a BER of a wavelength path, and the like.

Figure 7:
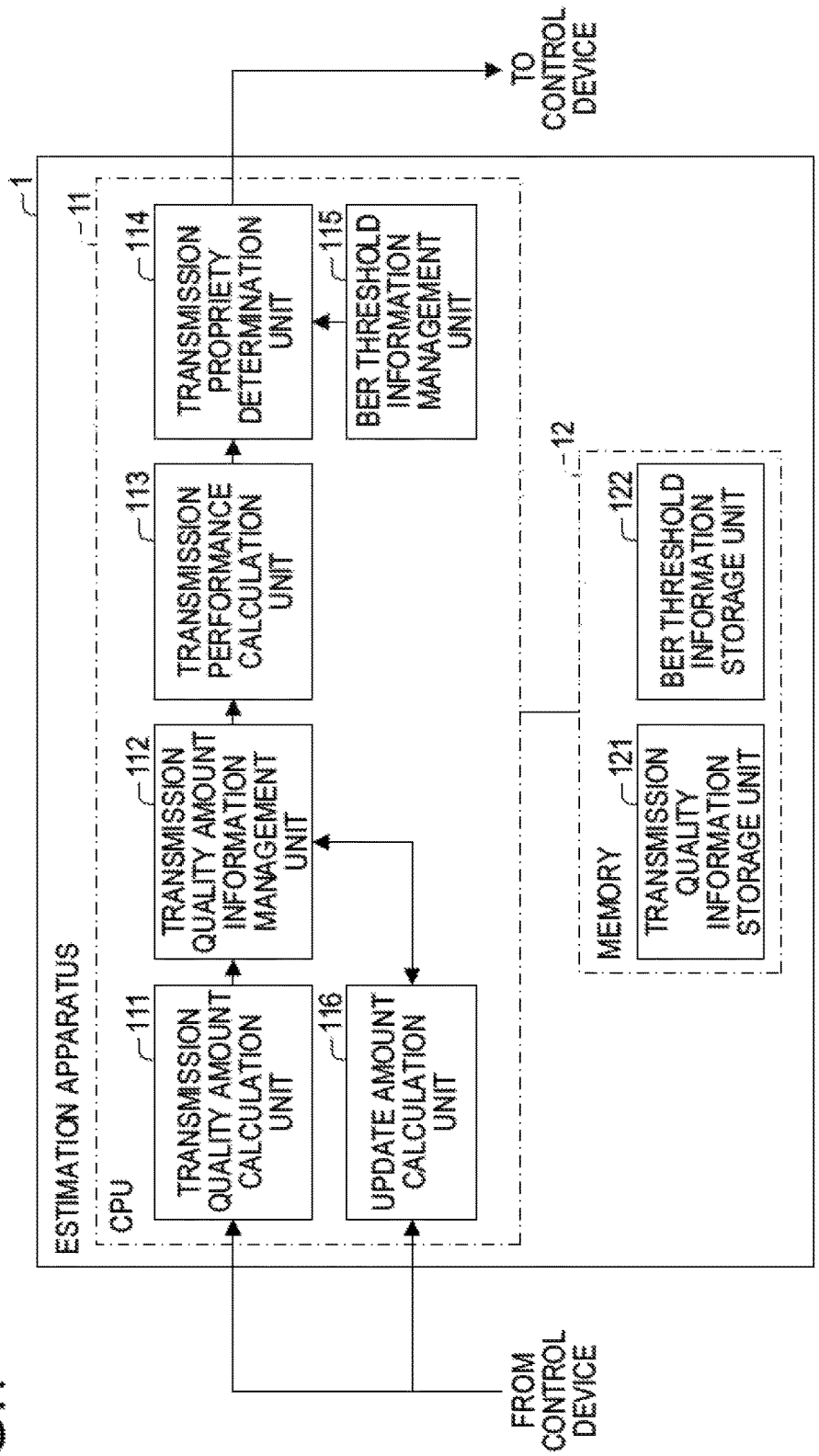
FIG. 7 is a block diagram illustrating an exemplary configuration of an estimation apparatus in the optical communication system illustrated in FIG. 5.

FIG. 7 is a block diagram illustrating an exemplary configuration of the estimation apparatus 1 in the optical communication system 100 illustrated in FIG. 5.

The estimation apparatus 1 is an example of an apparatus for estimating optical transmission performances and, as illustrated in FIG. 7, includes a central processing unit (CPU) 11 and a memory 12.

Illustratively, the memory 12 is a storage device including at least one of a nonvolatile memory such as a read only memory (ROM) and a volatile memory such as a random access memory (RAM). A program such as a basic input/output system (BIOS) may be written in the ROM of the memory 12. A software program written in the ROM or the RAM may be read and executed by the CPU 11 appropriately. Further, the RAM of the memory 12 may be used as a primary recording memory or a work memory.

As illustrated in FIG. 7, the memory 12 includes a transmission quality information storage unit 121 and a BER threshold information storage unit 122.

Illustratively, the transmission quality information storage unit 121 stores transmission quality amount information 1211 (described later with reference to FIG. 9) indicating the transmission quality amount (in other words, "quality deterioration amount") in each span.

Illustratively, the BER threshold information storage unit 122 stores BER threshold information indicating whether or not an optical signal may be transmitted using a certain path (in other words, a "section" or "span group") from the start point node 3 to the end point node 3.

Illustratively, the CPU 11 is a processing device that performs various controls and calculations, and implements various functions by executing an operating system (OS) and programs stored in the memory 12. That is, as illustrated in FIG. 7, the CPU 11 includes a transmission quality amount calculation unit 111, a transmission quality amount information management unit 112, a transmission performance calculation unit 113, a transmission propriety determination unit 114, a BER threshold information management unit 115, and an update amount calculation unit 116.

The programs for implementing the functions of the transmission quality amount calculation unit 111, the transmission quality amount information management unit 112, the transmission performance calculation unit 113, the transmission propriety determination unit 114, the BER threshold information management unit 115, and the update amount calculation unit 116 may be recorded on a recording medium. The recording medium on which the programs are recorded may be, for example, a flexible disk, a CD, a DVD, a Blu-ray disk, a magnetic disk, an optical disk, a magneto-optical disk, or a semiconductor memory, which may be readable by a computer. The CD may be a CD-ROM, CD-R, CD-RW or the like. The DVD may be DVD-ROM, DVD-RAM, DVD-R, DVD+R, DVD-RW, DVD+RW, HDDVD or the like. The semiconductor memory may be a flash memory such as a memory card or a USB (Universal Serial Bus) memory.

A computer (the CPU 11 in the first embodiment) may read a program from the above-described recording medium via a reading device (not illustrated) and transmit the read program to an internal recording device or an external recording device for storage. Further, the program may be recorded in a storage device (recording medium) such as a magnetic disk, an optical disk, a magneto-optical disk, or a semiconductor memory and may be provided from the storage device to the computer via a communication path.

When implementing the functions of the CPU 11, the programs stored in the internal storage device (the memory 12 in the first embodiment) may be executed by the computer (the CPU 11 in the first embodiment). Further, the computer may read and execute the programs recorded on the recording medium.

Illustratively, the transmission quality amount calculation unit 111 calculates the transmission quality amount in each span based on the wavelength path information and the BER information notified from the control device 2. As illustrated in FIG. 2, the wavelength path information may be information indicating one or more spans (in other words, "wavelength paths") through which optical signals of respective wavelengths are transmitted. The BER information may be information indicating the BER of an optical signal transmitted through one or more spans.

The control device 2 may instruct a node 3 of a measurement target of BER to transmit and/or receive an optical signal and causes the target node 3 to perform the transmission and/or reception of the optical signal to thereby measure or acquire BER information on the optical signal transmitted through a span or a span group. The measurement or acquisition of the BER information may be performed by causing the transmission quality amount calculation unit 111 to transmit and receive optical signals to and from the target node 3 via the control device 2.

The information acquired from the control device 2 by the transmission quality amount calculation unit 111 is not limited to the BER information. For example, the transmission quality amount calculation unit 111 may acquire information on an error vector magnitude (EVM) from the control device 2. In addition, the transmission quality amount calculation unit 111 may acquire, from the control device 2, information on parameters such as OSNR, chromatic dispersion, polarization mode dispersion, a polarization dependent loss (PDL), intra-channel nonlinearity, inter-channel nonlinearity, mutual phase modulation, and band narrowing.

Figure 8:
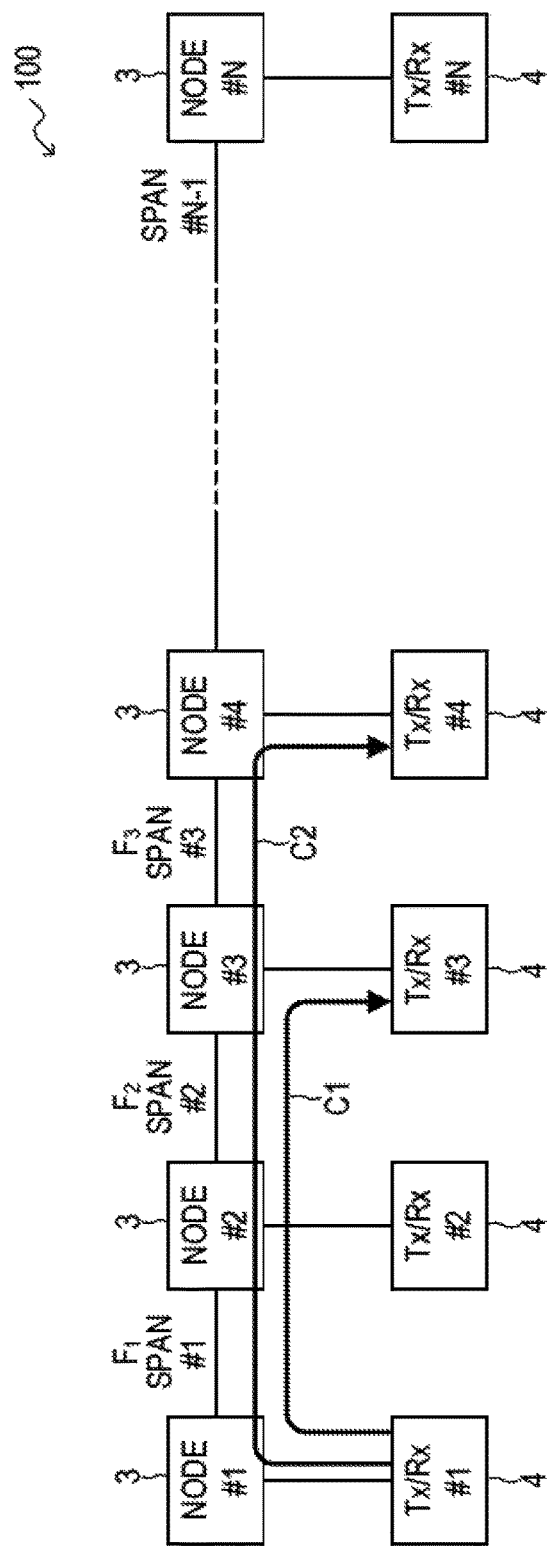
FIG. 8 is a view illustrating an example of transmission performance estimation in the optical communication system illustrated in FIG. 5.

FIG. 8 is a view illustrating an example of estimation of transmission performance in the optical communication system 100 illustrated in FIG. 5.

One of a plurality of paths (see, e.g., FIG. 5) constituted by a plurality of nodes 3 connected in a mesh shape is illustrated in FIG. 8.

The estimation apparatus 1 and the control device 2 are not illustrated in FIG. 8. For the sake of explanation, a transceiver 4 (indicated as "Tx/Rx #1 to #N") provided in each node 3 is illustrated independently of the node 3. That is, the Tx/Rx 4 illustrated in FIG. 8 is an example of the Tx 36 and the Rx 35 illustrated in FIG. 6. In the example illustrated in FIG. 8, the nodes #1 to #N may be provided with the Tx/Rx #1 to #N, respectively.

The nodes 3 may be connected so as to communicate with each other by an optical fiber transmission line. A transmission section between one node 3 and another may be referred to as a "span." In the example illustrated in FIG. 8, a transmission section between the node #1 and the node #2 is referred to as a span #1, a transmission section between the node #2 and the node #3 is referred to as a span #2, and a transmission section between the node #3 and the node #4 is referred to as a span #3. A transmission section between the node #N−1 (not illustrated in FIG. 8) and the node #N is referred to as a span #N−1.

In the example illustrated in FIG. 8, the transmission quality amount calculation unit 111 may acquire, from the control device 2, wavelength path information indicating a span group (see reference symbol C1) constituted by the spans #1 and #2 and BER information indicating the BER of an optical signal transmitted through the span group.

In addition, in the example illustrated in FIG. 8, the transmission quality amount calculation unit 111 may acquire, from the control device 2, wavelength path information indicating a span group (see reference symbol C2) constituted by the spans #1 and #2 and BER information indicating the BER of an optical signal transmitted through the span group.

Based on the wavelength path information and the BER information on the span group indicated by the reference symbol C1 and the wavelength path information and the BER information on the span group indicated by the reference symbol C2, the transmission quality amount calculation unit 111 may calculate the transmission quality amount of the span #3. Hereinafter, a span for which the transmission quality amount is calculated by the transmission quality amount calculation unit 111 is sometimes referred to as a target span.

The transmission quality amount calculation unit 111 may calculate the transmission quality amount F from the BER included in the BER information acquired from the control device 2, using the following equation (4). The equation (4) illustrates the transmission quality amount $F_{1-4}$ related to the span group (see reference symbol C2) constituted by the spans #1 to #3. In other words, the equation (4) illustrates the transmission quality amount $F_{1-4}$ of an optical signal transmitted from the node #1 to the node #4.

[Eq. 4]

$$F_{1-4} = \left(\mathrm{erfc}^{-1}(2BER_{1-4})\right)^2 \cdot \frac{2Rs}{Bn} \quad (4)$$

In the equation (4), Bn represents a noise bandwidth, and Rs represents a signal baud rate.

In addition, the transmission quality amount $F_{1-3}$ related to the span group (see reference symbol C1) constituted by the spans #1 and #2 may be calculated in the same manner as the transmission quality amount $F_{1-3}$ obtained in the equation (4).

The transmission quality amount calculation unit 111 may calculate the transmission quality amount F of the target span based on the two transmission quality amounts calculated from the BER, using the following equation (5). The equation (5) indicates the transmission quality amount $F_3$ of the span #3.

[Eq. 5]

$$F_3 = (F_{1-4}^{-1} - F_{1-3}^{-1})^{-1} \quad (5)$$

In FIG. 8, the transmission quality amount $F_3$ in the target span #3 is calculated by using the transmission quality amounts $F_{1-3}$ and $F_{1-4}$ in the two span groups from the same start point node #1 to the adjacent end point nodes #3 and #4, but the present disclosure is not limited thereto. For example, the transmission quality amount $F_{2-3}$ in the target spans #2 and #3 may be calculated by using the transmission quality amounts $F_{1-2}$ and $F_{1-3}$ in the span and the span group from the same start node #1 to the end point nodes #2 and #3.

That is, the transmission quality amount calculation unit 111 may be an example of an acquisition unit that acquires an index related to the first transmission performance and an index related to the second transmission performance in a transmission path of an optical signal passing through a plurality of nodes 3. Here, the first transmission performance may indicate the transmission performance of an optical signal transmitted through a span group between a first node 3 and an n-th (n is an integer equal to or greater than 3) node 3. The second transmission performance may indicate the transmission performance of an optical signal transmitted through a span or a span group between the first node 3 and an m-th (m is the natural number satisfying m<n) node 3.

The transmission quality amount calculation unit 111 may be an example of an estimation unit that estimates an index related to the transmission performance of an optical signal transmitted through a span between the m-th node 3 and the n-th node 3 based on the indexes related to the first and second transmission performances.

With the above configuration, it is possible to estimate the transmission performance appropriately. For example, it is possible to improve the estimation accuracy of the transmission quality amount F in each span.

The transmission quality amount calculation unit 111 may estimate an index related to the transmission performance of an optical signal transmitted through a span between the m-th node 3 and the n-th node 3 based on a difference between the index related to the first transmission performance and the index related to the second transmission performance.

This makes it possible to estimate the transmission performance by a simple calculation.

Examples of indexes related to the transmission performance may include parameters such as transmission quality amount F, BER, EVM, OSNR, chromatic dispersion, polarization mode dispersion, PDL, intra-channel nonlinearity, inter-channel nonlinearity, mutual phase modulation, and band narrowing.

The transmission quality amount information management unit 112 illustratively stores the transmission quality amount of the target span calculated by the transmission quality amount calculation unit 111 in the transmission quality information storage unit 121.

FIG. 9 is a table illustrating an example of the transmission quality amount information 1211 in the optical communication system 100 illustrated in FIG. 5.

The transmission quality amount information management unit 112 may store the transmission quality amount for each span included in the optical communication system 100, as the transmission quality amount information 1211, in the transmission quality information storage unit 121.

In the example illustrated in FIG. 9, the transmission quality amount information 1211 includes the transmission quality amounts $F_1$ to $F_{N-1}$ for the spans #1 to #N−1, respectively.

The transmission performance calculation unit 113 illustratively calculates the transmission quality amount on any path passing through a plurality of nodes 3 based on the transmission quality amount information 1211 stored in the transmission quality information storage unit 121. The "path" used herein may include one or more wavelength paths. Hereinafter, the "path" may be sometimes referred to as a "wavelength path." The transmission performance calculation unit 113 may calculate the BER in any wavelength path passing through the plurality of nodes 3 from the calculated transmission quality amount.

The transmission performance calculation unit 113 may calculate the transmission quality amount F using the following equation (6). The equation (6) illustrates the transmission quality amount $F_{1 \to N}$ in a wavelength path passing from the node #1 to the node #N indicated in FIG. 8.

[Eq. 6]

$$F_{1 \to N} = (F_1^{-1} + F_2^{-1} + \ldots + F_{N-1}^{-1})^{-1} \quad (6)$$

In addition, the transmission performance calculation unit 113 may calculate BER based on the transmission quality amount F calculated by the above equation (6), using the following equation (7). The equation (7) illustrates $BER_{1 \to N}$ in the wavelength path passing from the node #1 to the node #N indicated in FIG. 8.

[Eq. 7]

$$BER_{1 \to N} = \frac{1}{2} \text{erfc}\left( \sqrt{\frac{F_{1 \to N} \cdot Bn}{2Rs}} \right) \quad (7)$$

That is, the transmission performance calculation unit 113 may function as an example of a calculation unit that calculates an index related to the transmission performance of an optical signal transmitted through a section formed by one or more spans, based on a result of estimation of the index related to the transmission performance by the transmission quality amount calculation unit 111.

As a result, it is possible to improve the calculation accuracy of the transmission quality amount in a region where the influence of the nonlinearity indicated in FIG. 4 is large (e.g., "a section having many spans from the start point node 3").

Illustratively, the BER threshold information management unit 115 reads a BER threshold (which is sometimes referred to as "$BER_{th}$") stored in the BER threshold information storage unit 122 and inputs the read BER threshold to the transmission propriety determination unit 114.

Illustratively, the transmission propriety determination unit 114 determines whether or not it is possible to transmit an optical signal using any wavelength path passing through a plurality of nodes 3, based on the BER calculated by the transmission performance calculation unit 113.

The transmission propriety determination unit 114 may compare the BER calculated by the transmission performance calculation unit 113 with the BER threshold read by the BER threshold information management unit 115 to determine whether or not transmission is possible. When the calculated BER is smaller than the BER threshold (e.g., when $BER_{1 \to N} < BER_{th}$), the transmission propriety determination unit 114 may determine that the optical signal transmission is possible. Meanwhile, when the calculated BER is equal to or greater than the BER threshold, the transmission propriety determination unit 114 may determine that the optical signal transmission is not possible.

That is, the transmission propriety determination unit 114 may function as a determination unit that determines whether or not to transmit an optical signal in a section formed by one or more spans, based on a result of the calculation of the index related to the transmission performance by the transmission performance calculation unit 113.

As a result, it is possible to appropriately determine the propriety of transmission of an optical signal using a wavelength path.

The update amount calculation unit 116 illustratively updates the transmission quality amount information 1211 stored in the transmission quality information storage unit 121. The details of the update amount calculation unit 116 will be described later in a seventh modification. That is, the CPU 11 of the estimation apparatus 1 of the first embodiment may not have the function of the update amount calculation unit 116.

[A-2] Exemplary Operation

Figure 10:
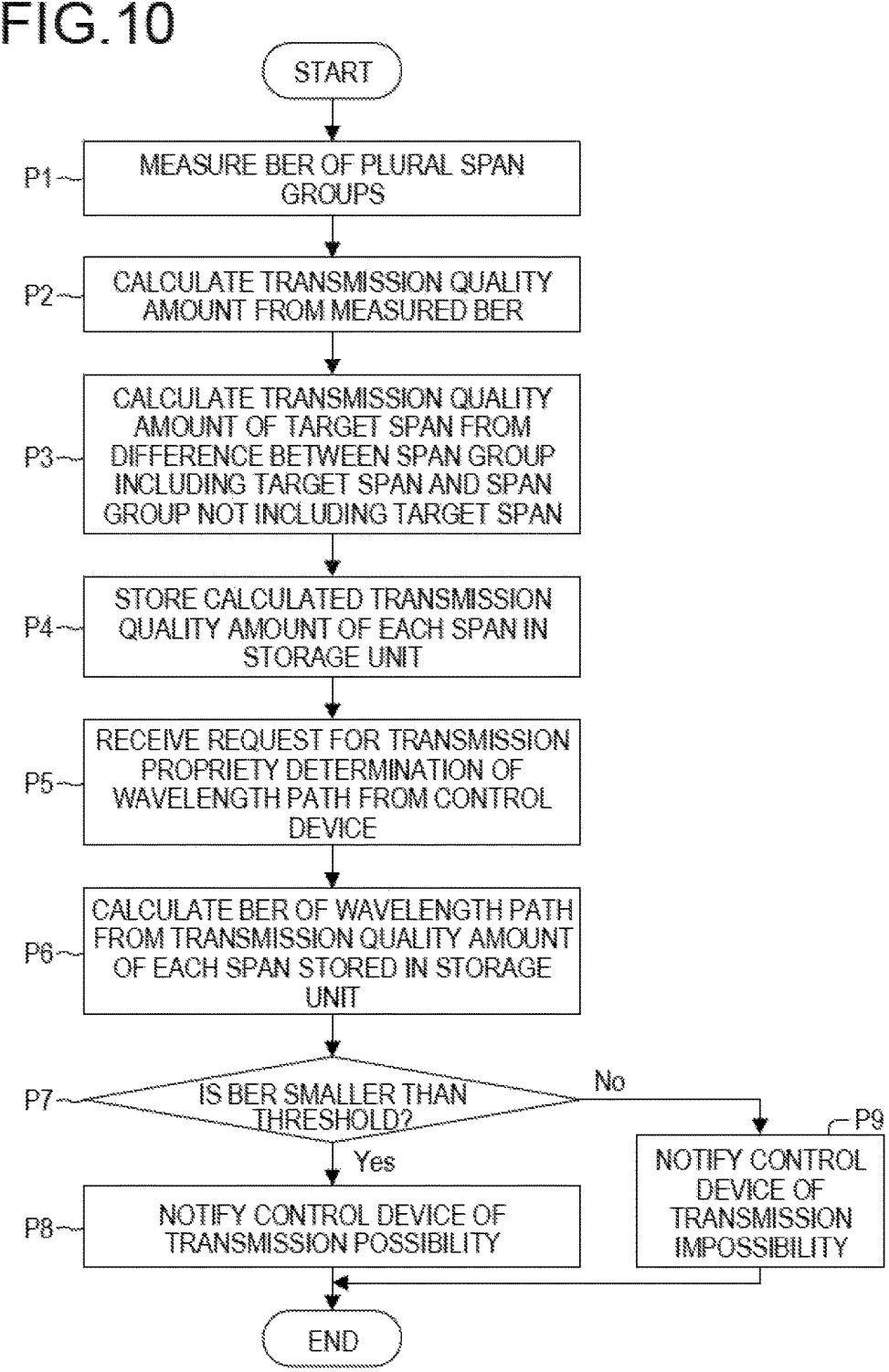
FIG. 10 is a flowchart for explaining a transmission performance estimation operation in the optical communication system illustrated in FIG. 5.

The operation of estimating the transmission performance in the optical communication system 100 of the first embodiment configured as described above will be described in accordance with a flowchart (Operations P1 to P9) illustrated in FIG. 10.

The transmission quality amount calculation unit 111 may measure the BERs of a plurality of span groups via the control device 2 (Operation P1).

The transmission quality amount calculation unit 111 may calculate the transmission quality amount from the measured BERs (Operation P2).

The transmission quality amount calculation unit 111 may calculate the transmission quality amount of a target span from a difference between the transmission quality amount in a span group including the target span and the transmission quality amount in a span or a span group not including the target span (Operation P3).

The transmission quality amount information management unit 112 may store the calculated transmission quality amount of each span in the transmission quality information storage unit 121 (Operation P4).

The transmission propriety determination unit 114 may receive from the control device 2 a request for transmission propriety determination using a certain wavelength path (Operation P5).

The transmission performance calculation unit 113 may calculate the BER of a wavelength path related to the request from the control device 2, from the transmission quality amount of each span stored in the transmission quality information storage unit 121 (Operation P6).

The transmission propriety determination unit 114 may determine whether or not the calculated BER is smaller than the BER threshold (Operation P7).

When it is determined that the calculated BER is smaller than the BER threshold (Yes in Operation P7), the transmission propriety determination unit 114 may notify the control device 2 of the fact that the optical signal may be transmitted using the wavelength path related to the request from the control device 2 (Operation P8). Then, the process is ended.

Meanwhile, when it is determined that the calculated BER is equal to or greater than the BER threshold (No in Operation P7), the transmission propriety determination unit 114 may notify the control device 2 of the fact that the optical signal may not be transmitted using the wavelength path related to the request from the control device 2 (Operation P9). Then, the process is ended.

[A-3] Modifications of First Embodiment

Next, modifications of the first embodiment will be described.

[A-3-1] First Modification

An example of estimating the transmission performance before the start of operation of the optical communication system 100 has been described in the above first embodiment, but the estimation of the transmission performance may be performed after the operation of the optical communication system 100 is started.

Figure 11:
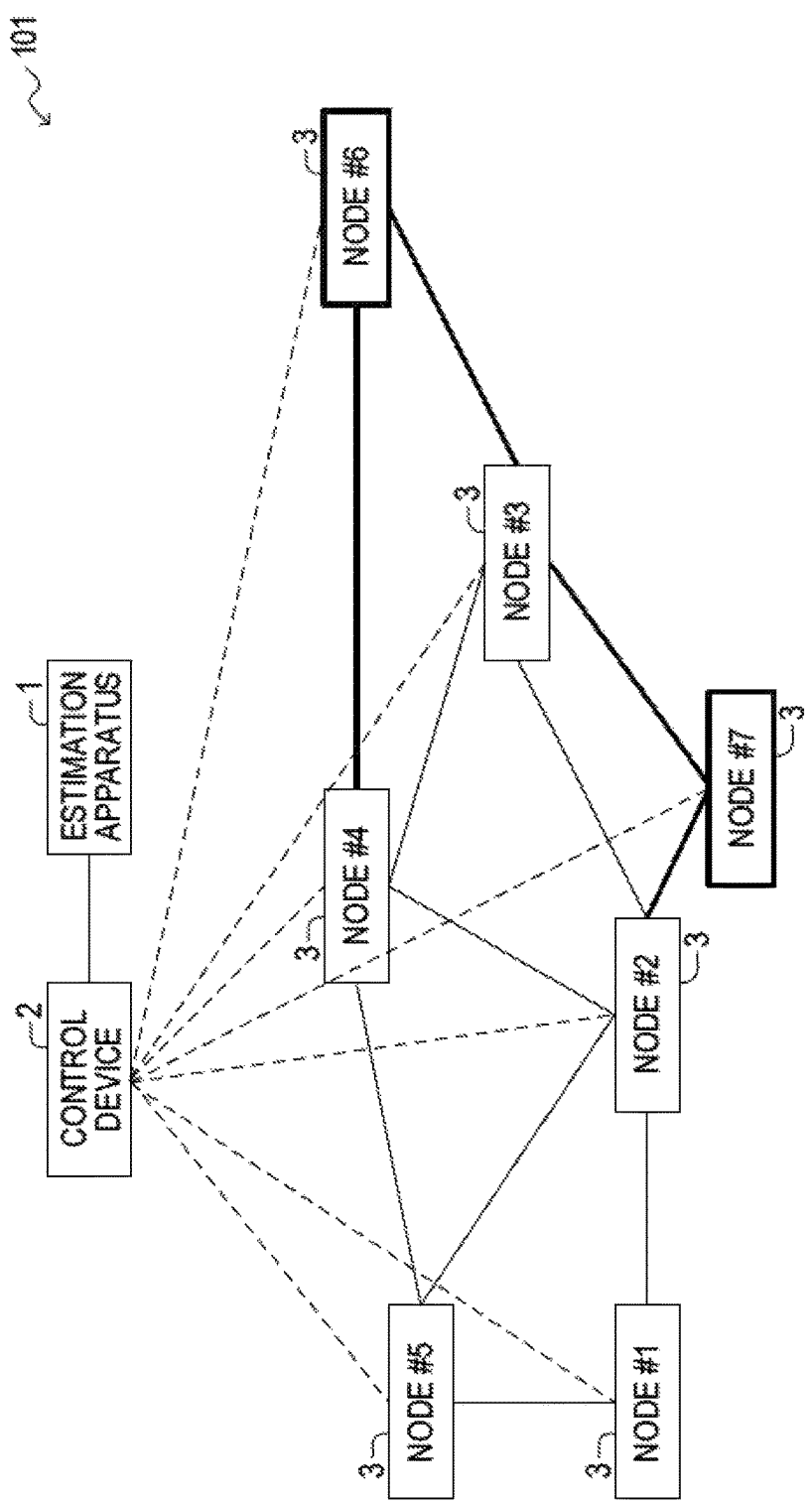
FIG. 11 is a block diagram illustrating an exemplary configuration of an optical communication system according to a first modification of the first embodiment.

FIG. 11 is a block diagram illustrating an exemplary configuration of an optical communication system 101 of a first modification.

The optical communication system 101 illustrated in FIG. 11 has, in addition to the nodes #1 to #5 provided at the time of starting the operation of the optical communication system 100 illustrated in FIG. 5, two nodes 3 (indicated as "node #6 & node #7"). The nodes #6 and #7 may be nodes 3 added to the optical communication system 100 illustrated in FIG. 5.

In the example illustrated in FIG. 11, the node #6 is connected to the nodes #3 and #4, and the node #7 is connected to the nodes #2 and #3.

The transmission quality amount calculation unit 111 of the estimation apparatus 1 may acquire the wavelength path information and the BER information related to the added node 3 and the span from the control device 2. In addition, the transmission quality amount calculation unit 111 may calculate the transmission quality amount in each added span (see the thick line in FIG. 11) based on the acquired wavelength path information and BER information.

In the example illustrated in FIG. 11, the transmission quality amount calculation unit 111 may calculate the transmission quality amount in a target span between the node #3 and the node #6 and the transmission quality amount in a target span between the node #4 and the node #6. In addition, the transmission quality amount calculation unit 111 may calculate the transmission quality amount in a target span between the node #2 and the node #7 and the transmission quality amount in a target span between the node #3 and the node #7.

According to the estimation apparatus 1 included in the optical communication system 101 of the first modification, it is possible to appropriately estimate the transmission quality amount related to the node 3 and the span added after the start of operation of the optical communication system 101.

[A-3-2] Second Modification

The two transmission quality amounts used for the calculation of difference by the transmission quality amount calculation unit 111 may be determined by a preset threshold.

Figure 12:
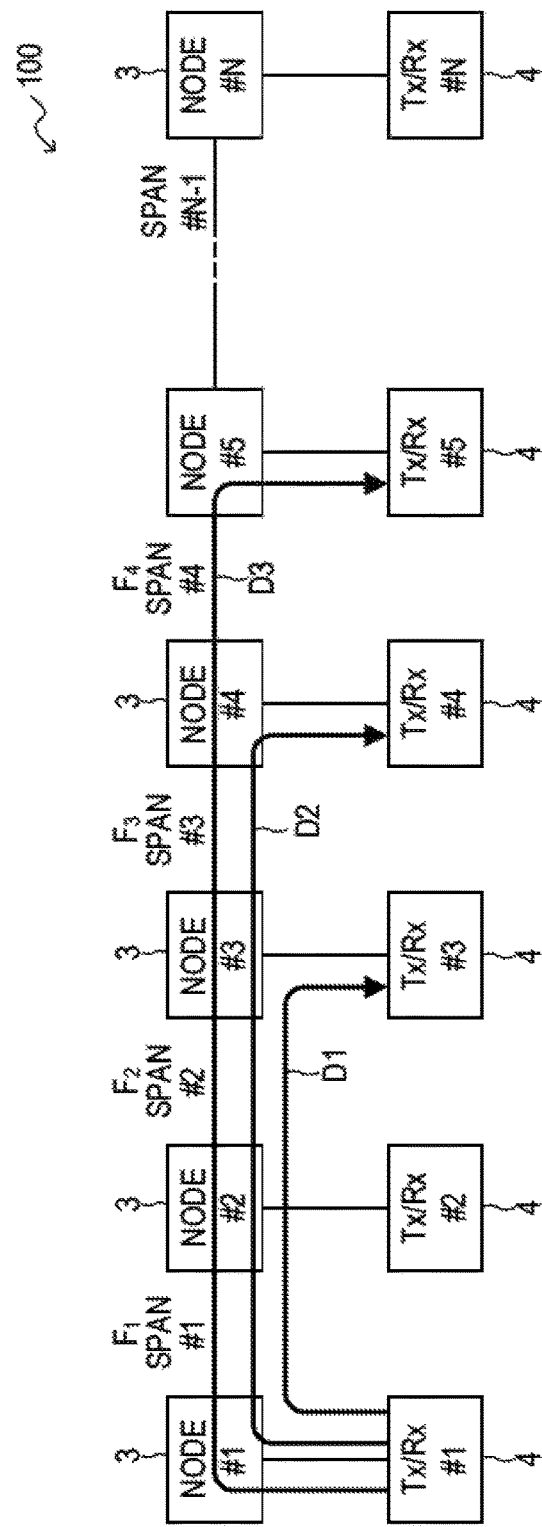
FIG. 12 is a view illustrating an example of transmission performance estimation in an optical communication system according to a second modification of the first embodiment.

FIG. 12 is a view illustrating an example of estimation of transmission performance in an optical communication system 100 according to a second modification.

One of a plurality of paths (see, e.g., FIG. 5) constituted by a plurality of nodes 3 connected in a mesh shape is illustrated in FIG. 12.

The estimation apparatus 1 and the control device 2 are not illustrated in FIG. 12. For the sake of explanation, a transceiver 4 (indicated as "Tx/Rx #1 to #N") provided in each node 3 is illustrated independently of the node 3. In other words, the Tx/Rx 4 illustrated in FIG. 12 is an example of the Tx 36 and the Rx 35 indicated in FIG. 6. In the example illustrated in FIG. 12, the nodes #1 to #N may be provided with the Tx/Rx #1 to #N, respectively.

The nodes 3 may be connected so as to communicate with each other by an optical fiber transmission line. A transmission section between one node 3 and another may be referred to as a "span." In the example illustrated in FIG. 12, a transmission section between the node #1 and the node #2 is referred to as a span #1, and a transmission section between the node #2 and the node #3 is referred to as a span #2. A transmission section between the node #3 and the node #4 is referred to as a span #3, and a transmission section between the node #4 and the node #5 is referred to as a span #4. A transmission section between the node #N−1 (not illustrated in FIG. 12) and the node #N is referred to as a span #N−1.

In the example illustrated in FIG. 12, the transmission quality amount calculation unit 111 may acquire, from the control device 2, wavelength path information indicating a span group (see reference symbol D1) constituted by the spans #1 and #2 and BER information indicating the BER of an optical signal transmitted through the span group.

In addition, in the example illustrated in FIG. 12, the transmission quality amount calculation unit 111 may acquire, from the control device 2, wavelength path information indicating a span group (see reference symbol D2) constituted by the spans #1 to #3 and BER information indicating the BER of an optical signal transmitted through the span group.

Further, in the example illustrated in FIG. 12, the transmission quality amount calculation unit 111 may acquire, from the control device 2, wavelength path information indicating a span group (see reference symbol D3) constituted by the spans #1 to #4 and BER information indicating the BER of an optical signal transmitted through the span group.

Figure 13:
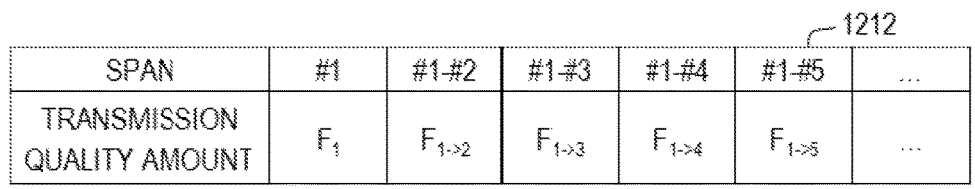
FIG. 13 is a table illustrating an example of span group transmission quality amount information in the optical communication system illustrated in FIG. 12.

FIG. 13 is a table illustrating an example of span group transmission quality amount information 1212 in the optical communication system 100 illustrated in FIG. 12.

The span group transmission quality amount information 1212 illustrated in FIG. 12 is illustratively stored in the transmission quality information storage unit 121. The transmission quality amount in each span or span group acquired by the transmission quality amount calculation unit 111 may be registered in the span group transmission quality amount information 1212.

In the example illustrated in FIG. 12, $F_1$ is registered in the transmission quality amount in the span #1, $F_{1 \rightarrow 2}$ is registered in the transmission quality amount in the span group #1 to #2, and $F_{1 \rightarrow 3}$ is registered in the transmission quality amount in the span group #1 to #3. $F_{1 \rightarrow 4}$ is registered in the transmission quality amount in the span group #1 to #4, and $F_{1 \rightarrow 5}$ is registered in the transmission quality amount in the span group #1 to #5.

For example, when increasing the number of spans to be measured, the transmission quality amount calculation unit 111 acquires the transmission quality amount of a span or span group. It is here assumed that a relationship between the transmission quality amount of a measured span or span group and a preset threshold $F_{th}$ of the transmission quality amount is set according to the following equation (8). When acquiring the transmission quality amount $F_{1 \rightarrow 5}$ in the span group #1 to #5, the transmission quality amount calculation unit 111 recognizes that the transmission quality amount $F_{1 \rightarrow 5}$ exceeds the threshold $F_{th}$. In this case, the transmission quality amount calculation unit 111 may calculate a difference between the transmission quality amount $F_{1 \rightarrow 4}$ in the span group #1 to #4 and the transmission quality amount $F_{1 \rightarrow 3}$ in the span group #1 to #3 and calculate the transmission quality amount $F_4$ of the span #4 based on the calculated difference.

[Eq. 8]

$$F_{1 \rightarrow 3}^{-1} < F_{1 \rightarrow 4}^{-1} < F_{th}^{-1} < F_{1 \rightarrow 5}^{-1} \quad (8)$$

That is, the transmission quality amount calculation unit 111 may further function as an example of an acquisition unit that acquires an index related to the fourth transmission performance of an optical signal transmitted through a span group between the first node 3 and the (n+1)$^{th}$ node 3 (n is an integer of 3 or more). Then, when the index related to the fourth transmission performance is larger than a predetermined threshold, the transmission quality amount calculation unit 111 may estimate an index related to the transmission performance of the optical signal transmitted through a span between the m-th (m is the natural number satisfying m<n) node 3 and the n-th node 3.

As a result, it is possible to efficiently estimate the transmission quality amount in each span.

[A-3-3] Third Modification

The two transmission quality amounts used for the calculation of difference by the transmission quality amount calculation unit 111 may be determined by a plurality of preset thresholds.

As in the second modification illustrated in FIG. 12, the transmission quality amount calculation unit 111 may acquire, from the control device 2, wavelength path information indicating each span group (see reference symbols D1 to D3) and BER information indicating the BER of an optical signal transmitted through each span group.

The BER included in the BER information acquired by the transmission quality amount calculation section 111 may be converted into the transmission quality amount and registered in the span group transmission quality amount information 1212 as in the second modification illustrated in FIG. 13.

For example, when the upper limit threshold $F_{th1}$ and the lower limit threshold $F_{th2}$ of the transmission quality amount are determined, the transmission quality amount calculation unit 111 may calculate the signal quality of each span in a range between $F_{th1}$ and $F_{th2}$. As one example, when a relationship between the transmission quality amount of the span or span group acquired by the transmission quality amount calculation unit 111 and the thresholds $F_{th1}$ and $F_{th2}$ is set according to the following equation (9), the transmission quality amount calculation unit 111 may calculate a difference between the transmission quality amount $F_{1\to 4}$ in the span group #1 to #4 and the transmission quality amount $F_{1\to 3}$ in the span group #1 to #3. In addition, in this case, the transmission quality amount calculation unit 111 may calculate a difference between the transmission quality amount $F_{1\to 5}$ in the span group #1 to #5 and the transmission quality amount $F_{1\to 4}$ in the span group #1 to #4. Then, the transmission quality amount calculation unit 111 may calculate the transmission quality amounts $F_3$ and $F_4$ of the spans #3 and #4.

[Eq. 9]

$$F_{th2}^{-1} < F_{1\to 3}^{-1} < F_{1\to 4}^{-1} < F_{1\to 5}^{-1} < F_{th1}^{-1} \quad (9)$$

That is, when a predetermined condition is satisfied, the transmission quality amount calculation unit 111 may estimate an index related to the transmission performance of an optical signal transmitted through a span between the m-th (m is the natural number satisfying m<n) node 3 and the n-th (n is an integer of 3 or more) node 3. Here, the case where the predetermined condition is satisfied may be a case where an index related to the first transmission performance is smaller than the predetermined first threshold, and an index related to the second transmission performance is larger than the predetermined second threshold. The first transmission performance may be transmission performance of an optical signal transmitted through a span group between the first node 3 and the n-th node 3. The second transmission performance may be transmission performance of an optical signal transmitted through a span or span group between the first node 3 and the m-th node 3.

As a result, it is possible to efficiently estimate the transmission quality amount in each span.

[A-3-4] Fourth Modification

A plurality of transmission quality amounts for each span may be stored in the transmission quality information storage unit 121.

FIG. 14 is a table illustrating an example of transmission quality amount information 1213 in an optical communication system 100 according to a fourth modification.

The transmission quality amount calculation unit 111 may calculate a plurality of transmission quality amounts for each target span.

FIG. 14 illustrates an example of calculating the transmission quality amount when the number of spans through which an optical signal is transmitted is small and the transmission quality amount when the number of spans through which an optical signal is transmitted is large. The case where the number of spans is small may be referred to as a case of a small span. The case where the number of spans is large may be referred to as a case of a large span.

In the transmission quality amount information 1213, the transmission quality amount of a small span may be transmission quality amount calculated by the transmission quality amount calculation unit 111 based on the transmission quality amount of two span groups (or one span and one span group) which are both small spans. The transmission quality amount of the small span may be only transmission quality amount measured or calculated for one span. For example, when the number of spans in a span group is equal to or smaller than a predetermined value, the transmission quality amount calculation unit 111 may determine that the span group is a small span. The predetermined value may be referred to as a switching threshold.

In addition, in the transmission quality amount information 1213, the transmission quality amount of a large span may be transmission quality amount calculated by the transmission quality amount calculation unit 111 based on the transmission quality amount of two span groups, at least one of which is a large span. For example, when the number of spans in a span group is larger than a predetermined value, the transmission quality amount calculation unit 111 may determine that the span group is a large span.

In the example illustrated in FIG. 14, $F_{x1}$ to $F_{xN-1}$ are registered as transmission quality amounts of small spans in the spans #1 to #N−1, respectively. In addition, $F_{y1}$ to $F_{yN-1}$ are registered as transmission quality amounts of large spans in the spans #1 to #N−1, respectively.

The transmission performance calculation unit 113 may calculate the transmission quality amount of a wavelength path related to a request from the control device 2 using the transmission quality amount of a small span and the transmission quality amount of a large span. For each span from the start point node 3 to a span number reaching a predetermined value among wavelength paths related to the request from the control device 2, the transmission performance calculation unit 113 may use the transmission quality amount of a small span to calculate the transmission quality amount of a wavelength path. For each span from the start point node 3 to a span number exceeding a predetermined value among wavelength paths related to the request from the control device 2, the transmission performance calculation unit 113 may use the transmission quality amount of a large span to calculate the transmission quality amount of a wavelength path.

The following equation (10) illustrates the transmission quality amount in a wavelength path from the node #1 to the node #N when the predetermined value is set to 3.

[Eq. 10]

$$F_{1 \to N} = (F_{x1}^{-1} + F_{x2}^{-1} + F_{x3}^{-1} + F_{y4}^{-1} + \ldots + F_{yN-1}^{-1})^{-1} \quad (10)$$

In the above equation (10), the transmission quality amount of a small span is used for the spans #1 to #3, and the transmission quality amount of a large span is used for the spans #4 to #N−1.

That is, in each of one or more spans, the transmission quality amount calculation unit 111 may estimate an index related to the transmission performance of an optical signal transmitted through a span between the m-th node 3 and the n-th node 3 with respect to a plurality of indexes related to the transmission performance according to a value of n. Here, n is an integer of 3 or more and m may be an integer satisfying m<n.

Then, the transmission performance calculation unit 113 may use any one of the plurality of indexes related to the transmission performance for each of the one or more spans to calculate the transmission performance of an optical signal to be transmitted through a section formed by the one or more spans.

With this configuration, it is possible to improve the calculation accuracy of the transmission quality amount of a wavelength path.

Figure 15:
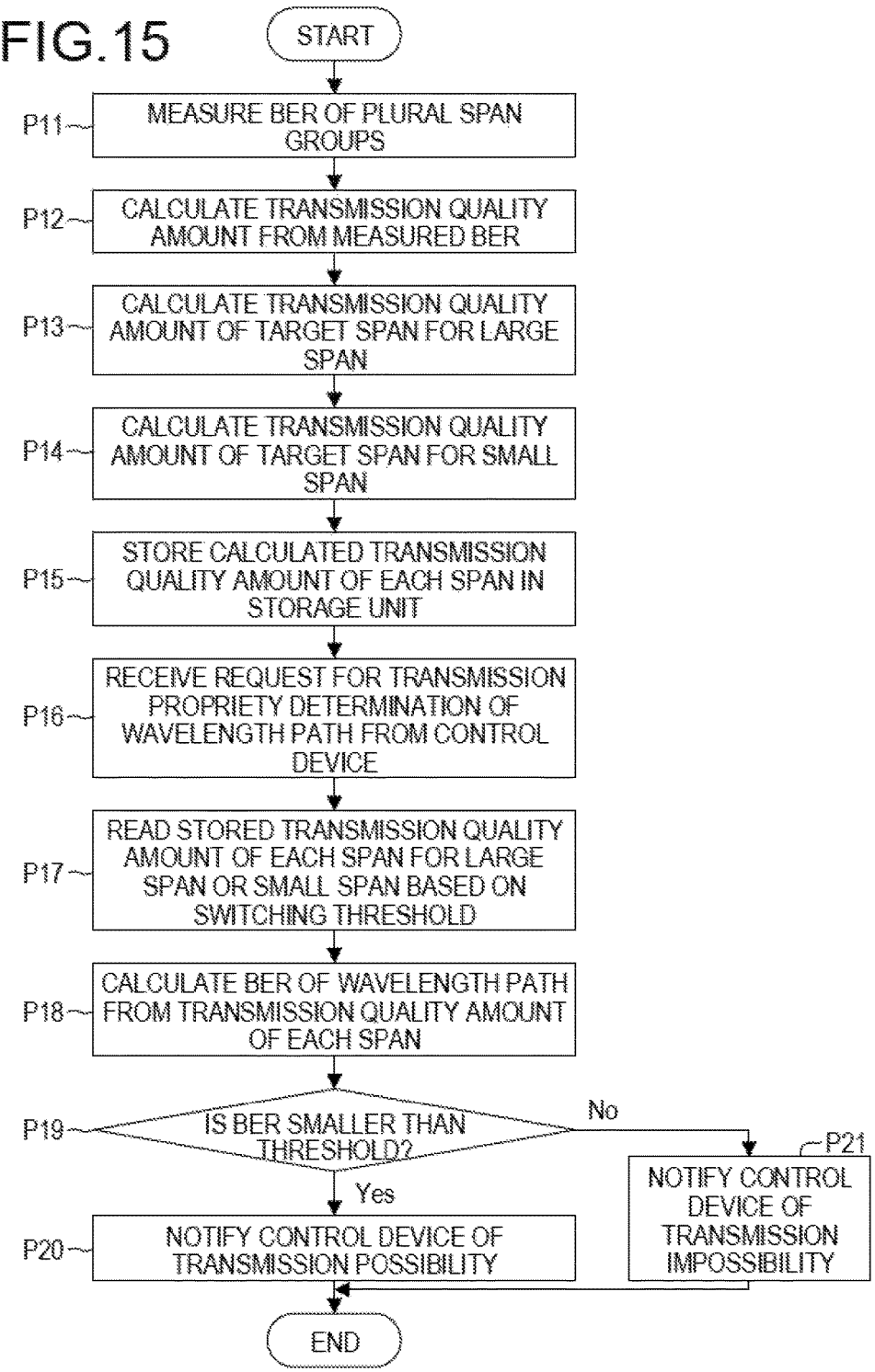
FIG. 15 is a flowchart for explaining a transmission performance estimation operation in the optical communication system illustrated in FIG. 14.

The operation of estimating the transmission performance in the optical communication system 100 of the fourth modification configured as described above will be described in accordance with a flowchart (Operations P11 to P21) illustrated in FIG. 15.

The transmission quality amount calculation unit 111 may measure the BERs of a plurality of span groups via the control device 2 (Operation P11).

The transmission quality amount calculation unit 111 may calculate the transmission quality amount from the measured BERs (Operation P12).

The transmission quality amount calculation unit 111 may calculate the transmission quality amount of a target large span from a difference between the transmission quality amount in a span group including the target span and the transmission quality amount in a span or a span group not including the target span (Operation P13).

The transmission quality amount calculation unit 111 may calculate the transmission quality amount of a target small span from a difference between the transmission quality amount in a span group including the target span and the transmission quality amount in a span or a span group not including the target span (Operation P14).

The transmission quality amount information management unit 112 may store the calculated transmission quality amount of each span in the transmission quality information storage unit 121 (Operation P15).

The transmission propriety determination unit 114 may receive from the control device 2 a request for transmission propriety determination using a certain wavelength path (Operation P16).

Based on a predetermined value (which may be referred to as a "switching threshold"), the transmission quality amount information management unit 112 may read the transmission quality amount in each span in a case of a large span or small span stored in the transmission quality information storage unit 121 (Operation P17).

The transmission performance calculation unit 113 may calculate the BER of a wavelength path related to the request from the control device 2, from the transmission quality amount of each span in the case of a large span or small span (Operation P18).

The transmission propriety determination unit 114 may determine whether or not the calculated BER is smaller than the BER threshold (Operation P19).

When it is determined that the calculated BER is smaller than the BER threshold ("Yes" in Operation P19), the transmission propriety determination unit 114 may notify the control device 2 of the fact that that the optical signal may be transmitted using the wavelength path related to the request from the control device 2 (Operation P20). Then, the process is ended.

Meanwhile, when it is determined that the calculated BER is equal to or greater than the BER threshold ("No" in Operation P19), the transmission propriety determination unit 114 may notify the control device 2 of the fact that the optical signal may not be transmitted using the wavelength path related to the request from the control device 2 (Operation P21). Then, the process is ended.

In addition, as illustrated in FIG. 1, the transmission quality amount in the case of a small span may be the transmission quality amount measured every span.

Further, the number of above-described switching thresholds is not limited to one but may be two or more. In a case where two or more switching thresholds are set, in addition to the case of a large span and the case of a small span, the transmission quality amount in a case of an intermediate span may be registered in the transmission quality amount information 1213 shown in FIG. 14.

For example, in an optical communication system 100 having the spans #1 to #15, a case where the two switching thresholds are 5 and 10 will be described. In this case, the transmission performance calculation unit 113 may calculate the transmission quality amount of a wavelength path by using the transmission quality amount calculated by two span groups with the number of spans of 4 or less for the spans #1 to #5. Further, the transmission performance calculation unit 113 may calculate the transmission quality amount of a wavelength path by using the transmission quality amount calculated by two span groups with the number of spans of 9 or less for the spans #6 to #10. Furthermore, the transmission performance calculation unit 113 may calculate the transmission quality amount of a wavelength path by using the transmission quality amount calculated by two span groups with the number of spans of 14 or less for the spans #11 to #15.

[A-3-5] Fifth Modification

The transmission quality amount information 1211 illustrated in FIG. 9 or the transmission quality amount information 1213 illustrated in FIG. 14 may be updated after the operation of the optical communication system 100 is started.

The following equation (11) illustrates an updated transmission quality amount $F_x'$ in a span #x when the transmission quality amount is actually measured for a wavelength path formed by the nodes #1 to #N.

[Eq. 11]

$$F_x' = (F_x^{-1} + \alpha_x(F_{1 \to N\_measured}^{-1} - F_{1 \to N}^{-1}))^{-1} \quad (11)$$

In the above equation (11), $F_{1 \to N\_measured}$ may be the measured transmission quality amount at the nodes #1 to #N. $a_x$ may be an update coefficient in the span #x.

As the update coefficient, one of the following two coefficients may be used.

Update coefficient=corresponding span loss/sum of span losses

Update coefficient=reciprocal of transmission quality quantity of corresponding span loss/reciprocal of transmission quality quantity of path In addition, after the operation of the optical communication system 100, the transmission quality amounts of spans other than a target span may be updated in the same manner as described above.

In other words, the transmission quality information storage unit 121 may function as an example of a first storage unit that stores an index related to the first transmission performance of an optical signal transmitted through a span group between the first node 3 and the n-th (n is an integer of 3 or more) node 3 acquired by the transmission quality amount calculation unit 111. In addition, the transmission quality information storage unit 121 may function as an example of a second storage unit that stores an index related to the third transmission performance of an optical signal transmitted through a span between the m-th (m is the natural number of m<n) node 3 and the n-th node 3 estimated by the transmission quality amount calculation unit 111.

The update amount calculation unit 116 may function as an example of an update unit that updates the stored index related to the third transmission performance. The updating of the index related to the third transmission performance may be carried out based on an actual measured value of an index related to the transmission performance of an optical signal transmitted through the span group between the first node 3 and the n-th node 3, the stored index related to the first transmission performance, and the stored index related to the third transmission performance.

With this configuration, it is possible to appropriately calculate the transmission quality amount of a wavelength path according to a change in system environments occurring after the start of operation of the optical communication system 100.

[A-3-6] Sixth Modification

The transmission quality amount of a wavelength path by the transmission performance calculation unit 113 may be calculated in consideration of the performance of an optical signal generated in a transceiver of the node 3.

As one example, the transmission quality amount of a wavelength path by the transmission performance calculation unit 113 may be calculated in consideration of the deterioration amount $F_{Tx/Tx}$ of an optical signal generated in the Rx 35 and Tx 36 indicated in FIG. 6 or the Tx/Rx 4 shown in FIG. 8. The following equation (12) indicates the transmission quality amount $F_{1 \to N}$ of a wavelength path formed by the nodes #1 to #N.

[Eq. 12]

$$F_{1 \to N} = (F_1^{-1} + F_2^{-1} + \ldots + F_{N-1}^{-1} + F_{Tx/Rx}^{-1}) \quad (12)$$

For example, $F_{TX/Rx}$ may be deterioration amount of an optical signal generated when the Tx36 and the Rx35 are directly connected.

As another example, when the transmission quality amount is OSNR, the transmission quality amount $F_{1 \to N}$ of the wavelength path formed by the nodes #1 to #N may be calculated according to the following equation (13).

[Eq. 13]

$$F_{1 \to N} = \kappa \frac{P_{sig}}{P_{ase\_1 \to N} + P_{NLI\_1 \to N} + \eta} \quad (13)$$

In this equation (13), $P_{ase}$ represents an amplified spontaneous emission (ASE) noise amount. $P_{NLI}$ represents nonlinear noise amount. The symbols κ and η are parameters determined by the performance of the BtoB connection of transponder (TRPN) (in other words, "0 km transmission"). The "BtoB" is an abbreviation for "Back To Back."

The transmission quality amount in the span #N−1 may be calculated according to the following equation (14).

[Eq. 14]

$$F_{N-1} = \kappa^{-1} \cdot (F_{1 \to N}^{-1} - F_{1 \to N-1}^{-1})^{-1} = \frac{P_{sig}}{P_{ase\_N-1} + P_{NLI\_N-1}} \quad (14)$$

Then, the transmission performance calculation unit 113 may calculate the transmission quality amount of a wavelength path formed by the nodes #1 to #N using the following equation (15), based on the transmission quality amount in each span.

[Eq. 15]

$$F_{1 \to N} = \kappa \cdot \left( (F_1^{-1} + F_2^{-1} + \ldots + F_{N-1}^{-1}) + \frac{\eta}{P_{sig}} \right)^{-1} \quad (15)$$

That is, the transmission performance calculation unit 113 may calculate an index related to the transmission performance of a transmitted optical signal by using the deterioration amounts of optical signals at the start point node 3 and the end point node 3 in a section formed by one or more spans.

As a result, it is possible to appropriately calculate the transmission quality amount of a wavelength path in consideration of the deterioration amount of an optical signal generated in the Tx/Rx 4.

[A-3-7] Seventh Modification

The transmission quality amount of a wavelength path by the transmission performance calculation unit 113 may be calculated in consideration of noise amount generated in an optical signal in the node 3.

Figure 16:
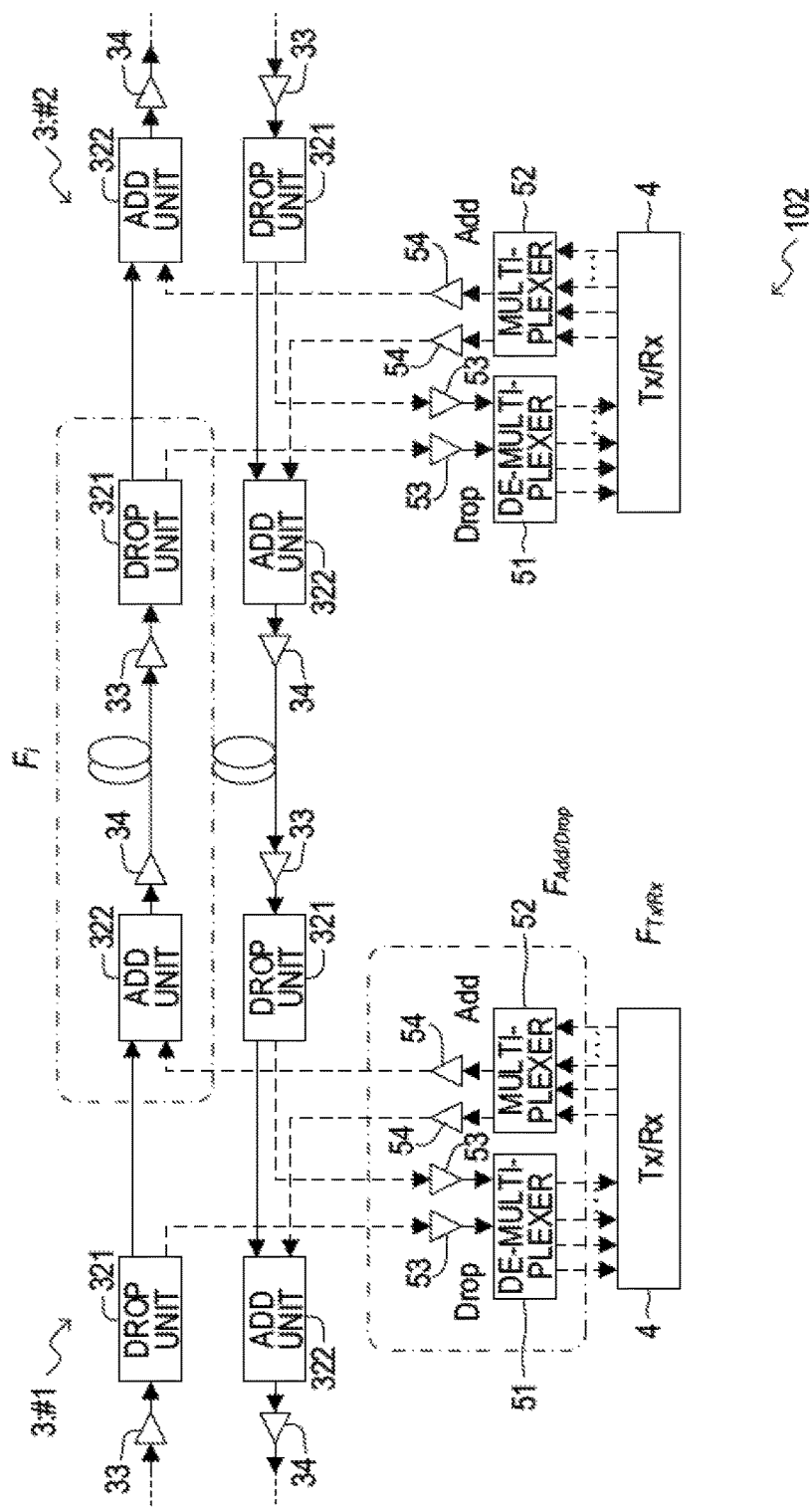
FIG. 16 is a block diagram illustrating an exemplary configuration of an optical communication system according to a seventh modification of the first embodiment.

FIG. 16 is a block diagram illustrating a configuration example of an optical communication system 102 according to a seventh modification.

Any two nodes 3 (e.g., the nodes #1 and #2) directly connected in the optical communication system 100 illustrated in FIG. 5 are illustrated in FIG. 16.

As illustrated in FIG. 16, each node 3 includes two drop units 321, two add units 322, two input amplifiers 33, two output amplifiers 34 and a Tx/Rx4. In addition, each node 3 illustratively includes a de-multiplexer 51, a multiplexer 52, two de-multiplexer input amplifiers 53, and two multiplexer output amplifiers 54. The node controller 31 illustrated in FIG. 6 is not illustrated in FIG. 16.

The drop units 321 and the add units 322 are illustratively an example of the optical add/drop unit 32 illustrated in FIG. 6.

The de-multiplexer input amplifiers 53 illustratively amplify optical signals input from the respective drop units 321.

Illustratively, the de-multiplexer 51 de-multiplexes optical signals input from the de-multiplexer input amplifiers 53 for each wavelength, and inputs the de-multiplexed optical signals to the Tx/Rx4, for example, each of the plurality of Rx35 illustrated in FIG. 6.

When an optical signal received in the Tx/Rx4 is a coherent optical signal, a splitter for distributing the power of the optical signal to each Rx35 in the Tx/Rx4 may be replaced for the de-multiplexer 51.

Illustratively, the multiplexer 52 multiplexes optical signals input from the Tx/Rx4, for example, each of the plurality of Txs36 illustrated in FIG. 6, and inputs the multiplexed optical signals to the multiplexer output amplifiers 54.

Illustratively, the multiplexer output amplifiers 54 input the optical signals input from the multiplexer 52 to the add units 322.

In the two de-multiplexer input amplifiers 53 and the two multiplexer output amplifiers 54, a noise amount may be generated in an optical signal. The de-multiplexer 51, the multiplexer 52, the two de-multiplexer input amplifiers 53, and the two multiplexer output amplifiers 54 may be collectively referred to as an Add/Drop unit.

Therefore, the transmission performance calculation unit 113 may calculate the transmission quality amount of a wavelength path using the following equation (16). In the equation (16), the deterioration amount $F_{Tx/Rx}$ of an optical signal generated in the Tx/Rx 4 described in the sixth modification is also taken into consideration.

[Eq. 16]

$$F_{1 \to N} = (F_1^{-1} + F_2^{-1} + \ldots F_{N-1}^{-1} + F_{Tx/Rx}^{-1} F_{Add/Drop}^{-1})^{-1} \quad (16)$$

The transmission quality amount calculated by the transmission performance calculation unit 113 may be divided into the transmission quality amount $F_i$ in each span, the deterioration amount $F_{Tx/Rx}$ of an optical signal generated in the Tx/Rx4, and the noise amount $F_{Add/Drop}$ generated in an optical signal in the Add/Drop unit.

That is, the transmission performance calculation unit 113 may calculate an index related to the transmission performance of a transmitted optical signal using the noise amount generated in the optical signal in each of the start point node 3 and the end point node 3 in a section formed by one or more spans.

As a result, it is possible to appropriately calculate the transmission quality amount of a wavelength path in consideration of the noise amount generated in an optical signal in the Add/Drop unit.

[B] Second Embodiment

A method of obtaining the transmission quality of a target span through measurement of the transmission quality amount of each wavelength path of one of a plurality of paths constituted by a plurality of nodes 3 connected in a mesh shape has been described in the first embodiment.

However, for example, in a case of newly constructing a large-scale network, a network in which a plurality of nodes 3 is connected in a complicated mesh shape, or the like, it may be difficult to determine an appropriate path from a plurality of paths.

For example, when a path that passes through a specific node 3 a plurality of times is selected as a path to be measured, since the number of measurements of the transmission quality amount of a wavelength path increases and the number of times of control of the node 3 also increases, there is a possibility of the increase in measurement time and device load. In addition, when a path with the small number of spans of a wavelength path (for example, not including the specific node 3) is selected as a path to be measured, the estimation accuracy of the transmission quality amount of a target span may be lowered.

Therefore, a second embodiment involves a method of determining a path to be measured from a plurality of paths constituted by a plurality of nodes 3, mainly in a network topology in which a plurality of nodes 3 is connected in a mesh shape, as will be described below.

[B-1] Exemplary System Configuration

Figure 17:
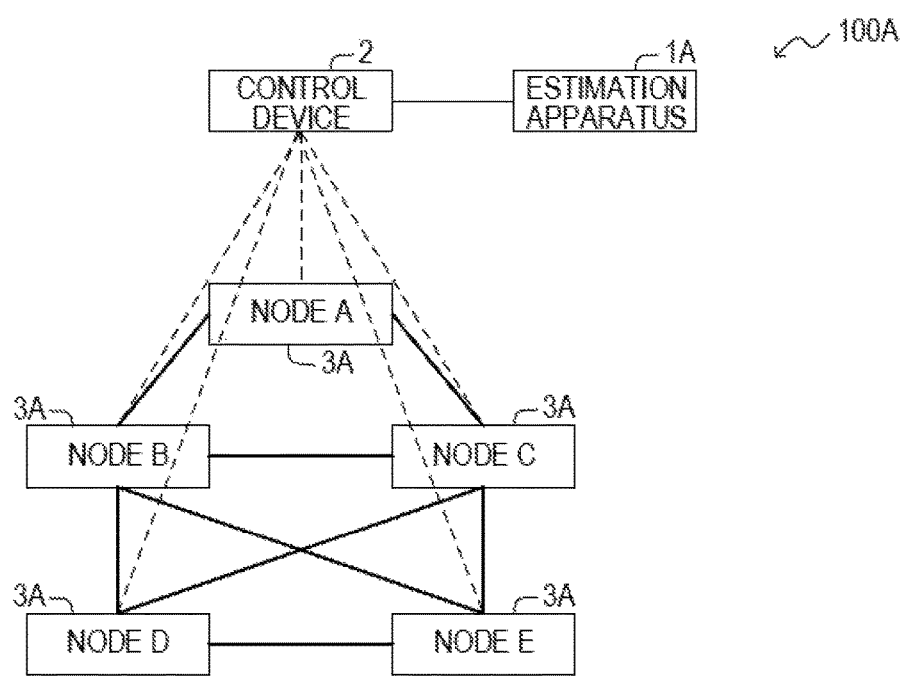
FIG. 17 is a block diagram illustrating an exemplary configuration of an optical communication system according to a second embodiment.

FIG. 17 is a block diagram illustrating a configuration example of an optical communication system 100A of the second embodiment.

As illustrated in FIG. 17, the optical communication system 100A includes an estimation apparatus 1A, a control device 2, and a plurality of nodes 3A (five nodes 3A in the illustrated example) indicated as nodes A to E. The function of the estimation apparatus 1A may be included in the control device 2.

Unless otherwise mentioned, the functions and configurations of the estimation apparatus 1A, the control device 2, and the nodes 3A and the connection relationship therebetween may be the same as those of the estimation apparatus 1, the control device 2 and the nodes 3 in the first embodiment.

Figure 18:
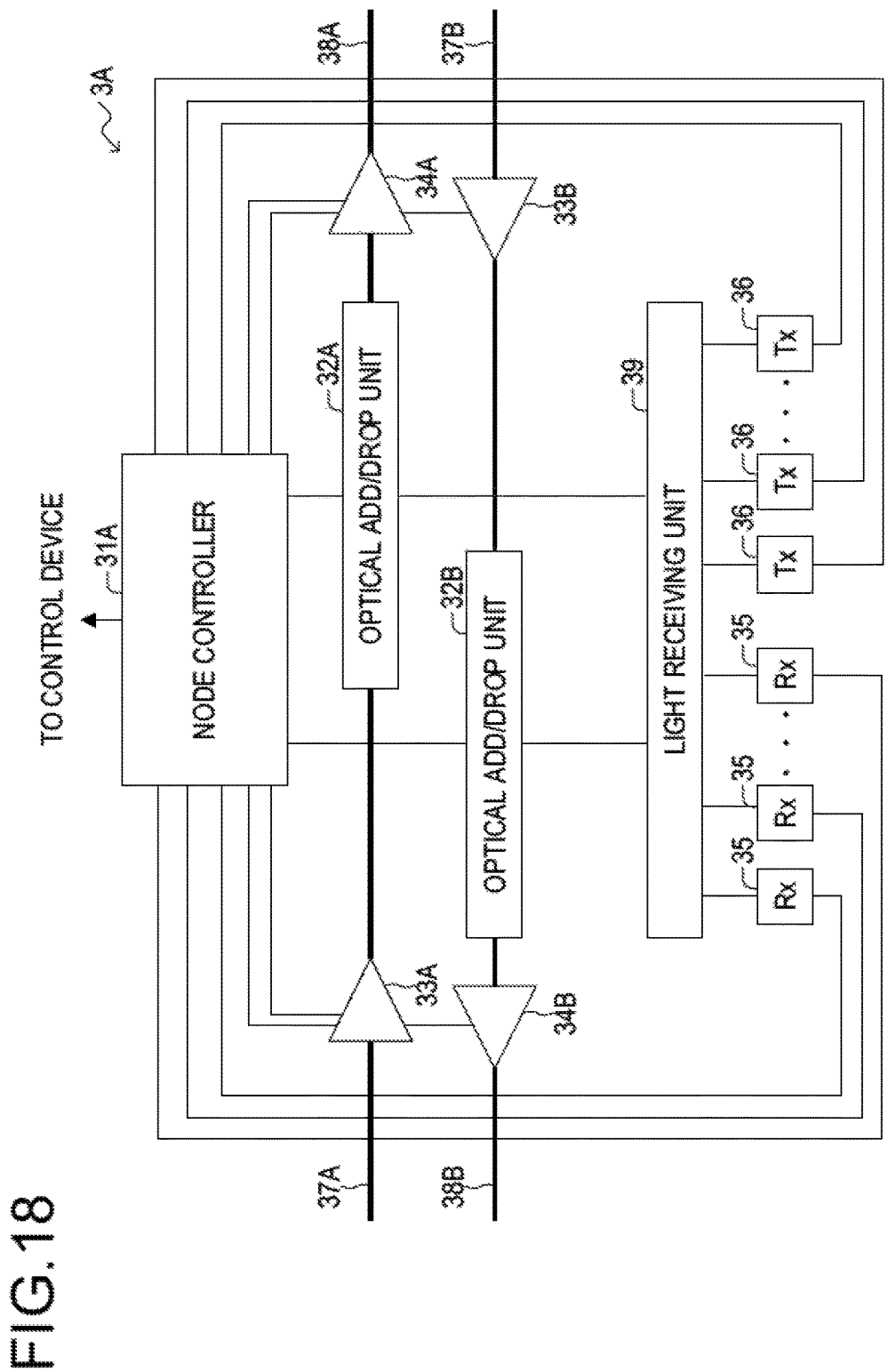
FIG. 18 is a block diagram illustrating an exemplary configuration of a node in the optical communication system illustrated in FIG. 17.

FIG. 18 is a block diagram illustrating a configuration example of the node 3A in the optical communication system 100A illustrated in FIG. 17. An example of the node 3A may include a reconfigurable optical add/drop device such as a reconfiguration optical add-drop multiplexer (ROADM). The ROADM may have the function such as color-less direction-less (CD) or color-less, direction-less, contention-less (CDC).

As illustrated in FIG. 18, the node 3A includes a node controller 31A, optical add/drop units 32A and 32B, input amplifiers 33A and 33B, output amplifiers 34A and 34B, a plurality of receiving units 35, a plurality of transmitting units 36 and a light receiving unit 39.

Each receiving unit ("Rx" in the example of FIG. 18) 35 and each transmitting unit ("Tx" in the example of FIG. 18) 36 may be respectively similar to the Rx35 and the Tx36 in the first embodiment illustrated in FIG. 6. Reference numerals 32A to 34A and 32B to 34B correspond to a configuration in which two systems of the optical add/drop units 32, the input amplifiers 33 and the output amplifiers 34 according to the first embodiment illustrated in FIG. 6 are provided, for example in different transmission directions of optical signals.

The node controller 31A illustratively controls the optical add/drop units 32A and 32B, the input amplifiers 33A and 33B, and the output amplifiers 34A and 34B. Similarly to the node controller 31 of the first embodiment, the node controller 31A is communicably connected to the control device 2, and may cause the Rx35 to measure the BER of a wavelength path and may notify the device 2 of information including a result of the measurement of the BER.

The light receiving unit 39 is communicably connected to the optical add/drop units 32A and 32B, the Rx35 and the Tx36. For example, the light receiving unit 39 separates optical signals input from the optical add/drop units 32A and 32B and outputs the separated optical signals to the Rx35, and multiplexes optical signals input from the Tx36 and outputs the multiplexed optical signals to the optical add/drop units 32A and 32B.

In the node 3 according to the first embodiment illustrated in FIG. 6, a block between the optical add/drop unit 32 and the Rx35 and Tx36 may be replaced with the light receiving unit 39. Alternatively, the light receiving unit 39 illustrated in FIG. 18 may be divided into a de-multiplexing part for the Rx35 and a multiplexing part for the Tx36.

Figure 19:
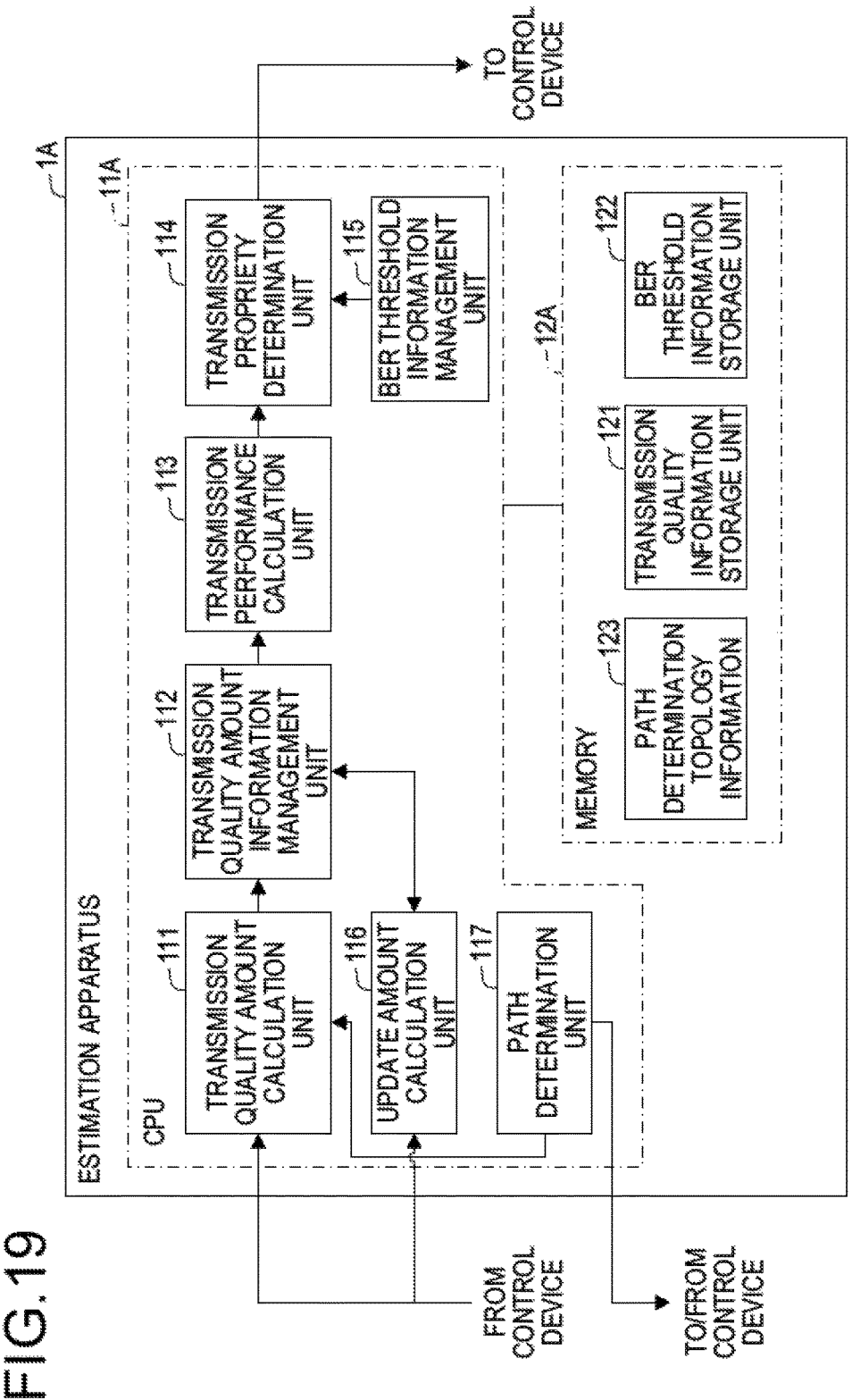
FIG. 19 is a block diagram illustrating an exemplary configuration of an estimation apparatus in the optical communication system illustrated in FIG. 17.

FIG. 19 is a block diagram illustrating a configuration example of the estimation apparatus 1A in the optical communication system 100A illustrated in FIG. 17.

The estimation apparatus 1A is an example of an optical transmission performance estimation apparatus and illustratively includes a CPU 11A and a memory 12A, as illustrated in FIG. 19.

The CPU 11A has the same functions as the CPU 11 according to the first embodiment illustrated in FIG. 7 and includes a path determination unit 117 as illustrated in FIG. 19.

Based on topology information of a network in which a plurality of nodes 3A is connected in a mesh shape (which may be referred to as "network topology information"), the path determination unit 117 determines a path to be measured from a plurality of paths formed by the plurality of nodes 3A. The "path" is an example of a transmission path of an optical signal passing through a plurality of nodes.

For example, the path determination unit 117 may select a path that passes through a transmission line in a network in a single stroke, as a path to be measured. For example, as illustrated in FIG. 8 and the like, the path to be measured is a measurement target of the transmission quality amount by the transmission quality amount calculation unit 111 or the like according to the first embodiment.

The topology information is an example of information indicating the connection relationship of the nodes 3A and the like and may include, for example, information indicating which node 3A a node 3A is connected to.

In the second embodiment, it is assumed that the topology information includes two nodes 3A each having an odd number of routes. The number of routes may mean the number of transmission lines (which may be referred to as "links") connected to the nodes 3A. The two nodes 3A (nodes D and E in the example of FIG. 17) each having an odd number of routes are nodes 3A of the start point and the end point of the single stroke path selected by the path determination unit 117, respectively.

The topology information may be generated or managed in the nodes 3A or the control device 2, for example. The path determination unit 117 may acquire the topology information from the nodes 3A or the control device 2 via the control device 2 or may acquire the topology information input by an operator through a management terminal (not illustrated) or the like.

The control device 2 or the nodes 3A may have network management software such as a software defined networking (SDN) controller or a network management system (NMS) for generating or managing the topology information. Alternatively, a function corresponding to opening shortest path first (OSPF) or the like may be mounted on the nodes 3A.

The memory 12A may store information similar to that of the memory 12 according to the first embodiment illustrated in FIG. 7 and may store path determination topology information 123 (which may be hereinafter simply referred to as "topology Information 123"), as illustrated in FIG. 19.

For example, when acquiring the topology information via the control device 2, the path determination unit 117 may rewrite the topology information and store the rewritten topology information, as the path determination topology information 123, in the memory 12A.

Figure 20:
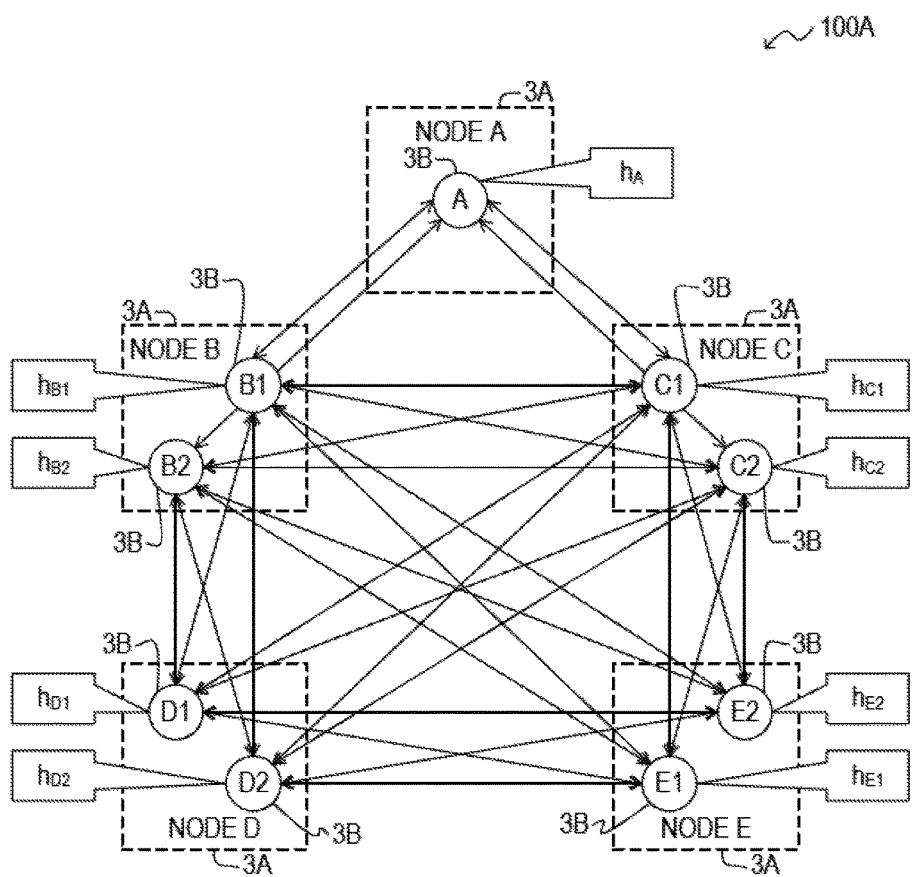
FIG. 20 is a view illustrating an example of topology information for path determination in the optical communication system illustrated in FIG. 17.

FIG. 20 is a view illustrating an example of the topology information 123 for path determination in the optical communication system 100A illustrated in FIG. 17.

For example, the path determination unit 117 rewrites the topology information so that each of the nodes 3A included in the acquired topology information is separated into (N+1)/2 nodes when the route number N (N is an integer) of the node 3A is an odd number and separated into N/2 nodes when the route number N is an even number.

Hereinafter, in order to distinguish the separated node from the node 3A shown in FIG. 17, the separated node is referred to as a node 3B. In addition, when representing a specific node 3B, it is expressed as "node B1" and "node C2" using the notation of FIG. 20. In relation to the actual node 3A, the node 3B may be positioned at a provisional (or temporary or virtual) node for path determination.

In the example of FIG. 20, the topology information 123 will be described with reference to a block diagram indicating the connection relation between the nodes 3A for convenience. However, the memory 12A may store information such as an arrangement or database indicating the above-described connection relationship, as the topology information 123.

As the topology information 123, as illustrated in FIG. 20, a link between the nodes 3A may be replaced with a plurality of links between the nodes 3B. For example, in the topology information 123, a link between the nodes B and C is replaced with a link between the nodes B1 and C1, a link between the nodes B1 and C2, a link between the nodes B2 and C1 and a link between the nodes B2 and C2.

Figure 21:
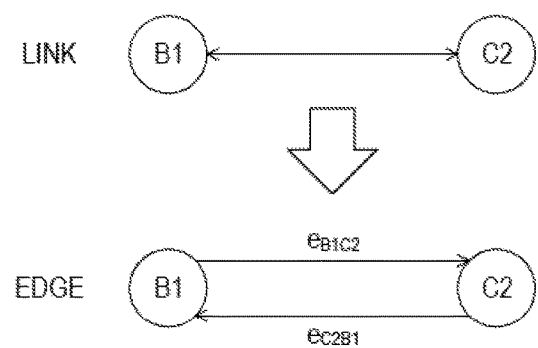
FIG. 21 is a view for explaining an example of an edge in the topology information illustrated in FIG. 20.

As illustrated in FIG. 21, a link between the nodes B may be grasped as a set of edges "e" in consideration of a direction. For example, a link between the nodes B1 and C2 may include an edge "e" from node B1 to the node C2 and an edge "e" from the node C2 to the node B1. The edge "e" may be a variable having a value of "0" or "1." For example, "1" may be set in the edge "e" when adopted as a path, and "0" may be set in the edge 2 when not adopted as a path.

Hereinafter, when representing an edge "e" from a certain node src (Source) to a certain node dst (Destination), the sign of "src" or "dst" is added to the sign "e" of the edge. For example, an edge "e" from the node B1 to the node C2 is denoted as an edge $e_{B1C2}$, and an edge "e" from the node C2 to the node B1 is denoted as an edge $e_{C2B1}$.

Here, as illustrated in FIG. 20, a passing order "h" may be associated with each of the nodes 3B. The passing order "h" may be an integer variable, and an order in which an optical signal passes through the node 3B in a path may be set.

Hereinafter, when representing a passing order "h" of a specific node 3B, the sign of the node 3B is added following the sign "h" of the passing order. For example, a passing order of the node B1 is denoted by $h_{B1}$ and a passing order of the node F2 is denoted by $h_{F2}$. The passing order "h" may be included in the topology information 123, or may be managed in association with the node 3B, as information separate from the topology information 123.

The path determination unit 117 may calculate the passing order "h" related to each node 3B so that the total value of the passing orders "h" related to each node 3B becomes minimal. For example, the path determination unit 117 may calculate the passing order "h" using a mathematical programming method based on the objective function that minimizes the total value of the passage orders "h" related to each node 3B and the constraint conditions thereof.

In the example of FIG. 20, the objective function is $h_A + h_{B1} + h_{B2} + h_{C1} + h_{C2} + h_{D1} + h_{D2} + h_{E1} + h_{E2}$. The path determination unit 117 obtains the passing order "h" of each of the nodes 3A that minimizes this objective function under the following constraint conditions 1 to 3.

The constraint conditions 1 to 3 will be described below with reference to FIGS. 22 to 24.

(Constraint Condition 1)

A path passes through each link between the nodes 3A only once.

Figure 22:
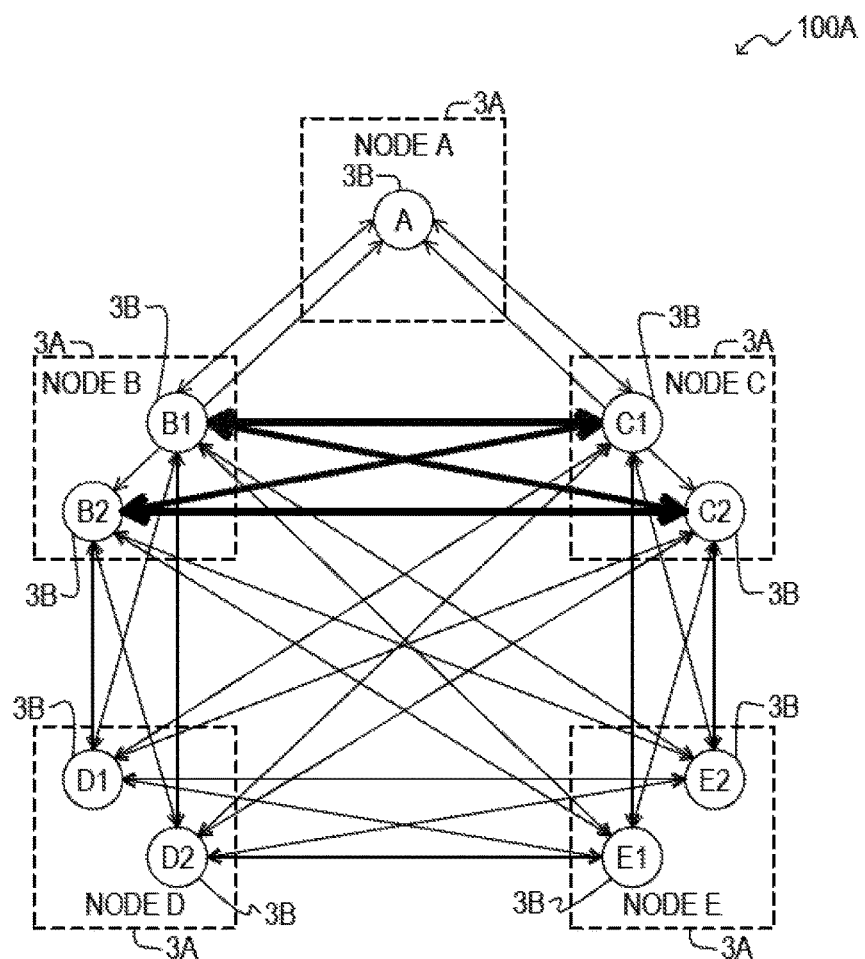
FIG. 22 is a view for explaining an example of a first constraint condition.

For example, for each link between the nodes 3A, only one of a plurality of edges "e" in the link becomes "1." As one example, as illustrated in FIG. 22, a link between the nodes B and C satisfies the conditional equation of $e_{B1C1} + e_{B1C2} + e_{C2B1} + e_{B2C2} + e_{C1B1} + e_{B2C2} + e_{C2B2} = 1$.

In this manner, in the constraint condition 1, the other edge "e" is not selected in a link in which an edge "e" selected as a path even once is present. For example, when the edge $e_{B1C2}$ from the node B1 to the node C2 is selected in a link between the nodes B and C, the remaining edges "e" between the nodes B and C are not selected. This makes it possible to avoid including redundant spans in the path.

(Constraint Condition 2)

The number of input/output edges of the node 3B is limited depending on the type of the node 3B.

The type of the node 3B may include "start point node," "intermediate node," and "end point node." For example, for a start point node 3A which is the start point of a path, a start point node 3B is assigned to one node 3B in the node 3A. For an end point node 3A which is the end point of the path, an end point node 3B is assigned to one node 3B in the node 3A. An intermediate node 3B is assigned to a node 3B which has not been selected as the start point or end point node 3B in the start point or end point node 3A and each node 3B in the intermediate node 3A which is the relay point of the path.

In the start point node 3B, the sum of the edges e from the start point node 3B is "1," and the sum of the edges "e" entering the start point node 3B is "0." That is, in the start point node 3B, one edge "e" comes from the starting point node 3B, and no edge "e" goes to the starting point node 3B.

In the intermediate node 3B, the sum of the edges "e" from the intermediate node 3B is "1," and the sum of the edges "e" entering the intermediate node 3B is "1." That is, in the intermediate node 3B, one edge "e" comes from the intermediate node 3B, and one edge "e" goes to the intermediate node 3B.

In the end point node 3B, the sum of the edges "e" from the end point node 3B is "0," and the sum of the edges "e" entering the end point node 3B is "1." That is, in the end point node 3B, no edge "e" comes from the end point node 3B, and one edge "e" goes to the end point node 3B.

Figure 23:
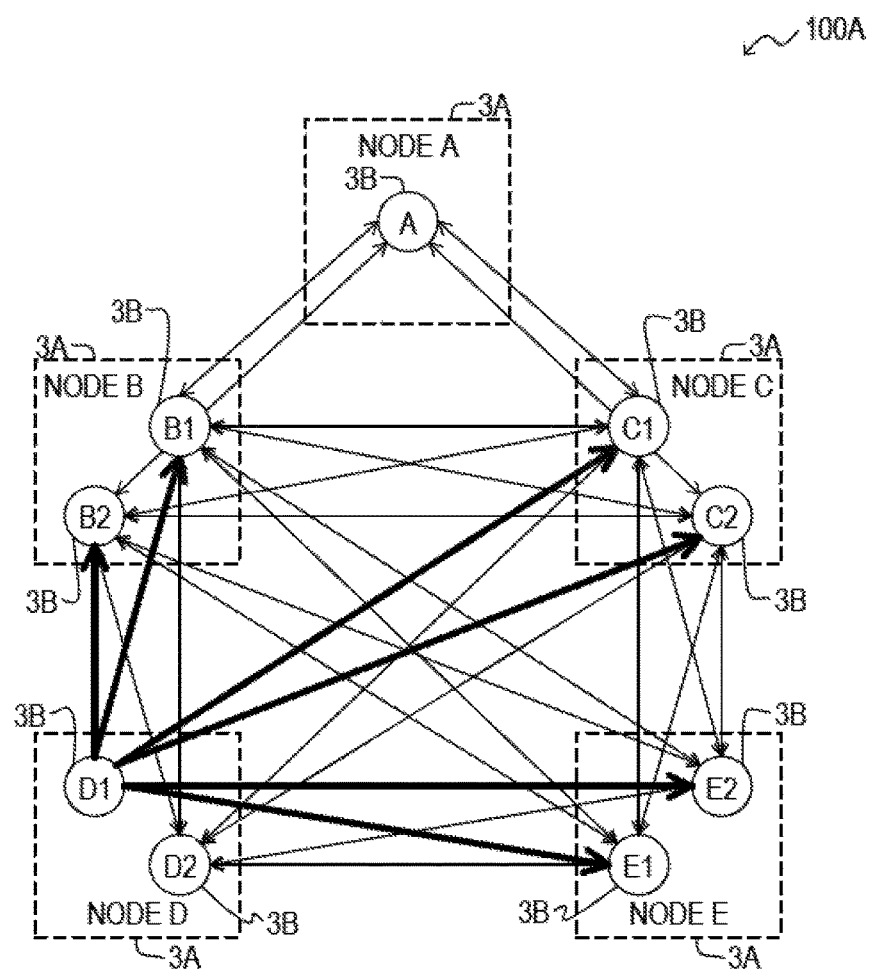
FIG. 23 is a view for explaining an example of a second constraint condition.

As an example, as illustrated in FIG. 23, when the node D1 is set as a start point node 3B, the sum of the edges e coming from the node D1 is $e_{D1B1} + e_{D1B2} + e_{D1C1} + e_{D1C2} + e_{D1E1} + e_{D1E2} = 1$. The sum of the edges "e" entering the node D1 is $e_{B1D1} + e_{B2D1} + e_{C1D1} + e_{C2D1} + e_{E1D1} + e_{E2D1} = 0$.

As another example, when the node A is an intermediate node 3B, the sum of the edges "e" coming from the node A is $e_{AB1} + e_{AB2} + e_{AC1} + e_{AC2} = 1$. The sum of the edges "e" entering the node A is $e_{B1A} + e_{B2A} + e_{C1A} + e_{C2A} = 1$.

As another example, when the node E2 is an end point node 3B, the sum of the edges "e" coming from the node E2 is $e_{E2B1} + e_{E2B2} + e_{E2C1} + e_{E2C2} + e_{E2D1} + e_{E2D2} = 0$. The sum of the edges "e" entering the node E2 is $e_{B1E2} + e_{B2E2} + e_{C1E2} + e_{C2E2} + e_{D1E2} + e_{D2E2} = 1$.

In this manner, in the constraint condition 2, the number of edges "e" adopted for a path between a node 3B and an adjacent node 3B is limited depending on the type of the node 3B. This makes it possible to avoid including redundant spans in the path. The adjacent node 3B may mean another node 3B having a link with a certain node 3B. For example, the adjacent node 3B may be another node 3B communicably connected to a certain node 3B via an optical fiber transmission line.

(Constraint Condition 3)

A value of the passing order h of the nodes 3B at both ends of a selected edge "e" is hsrc<hdst.

Figure 24:
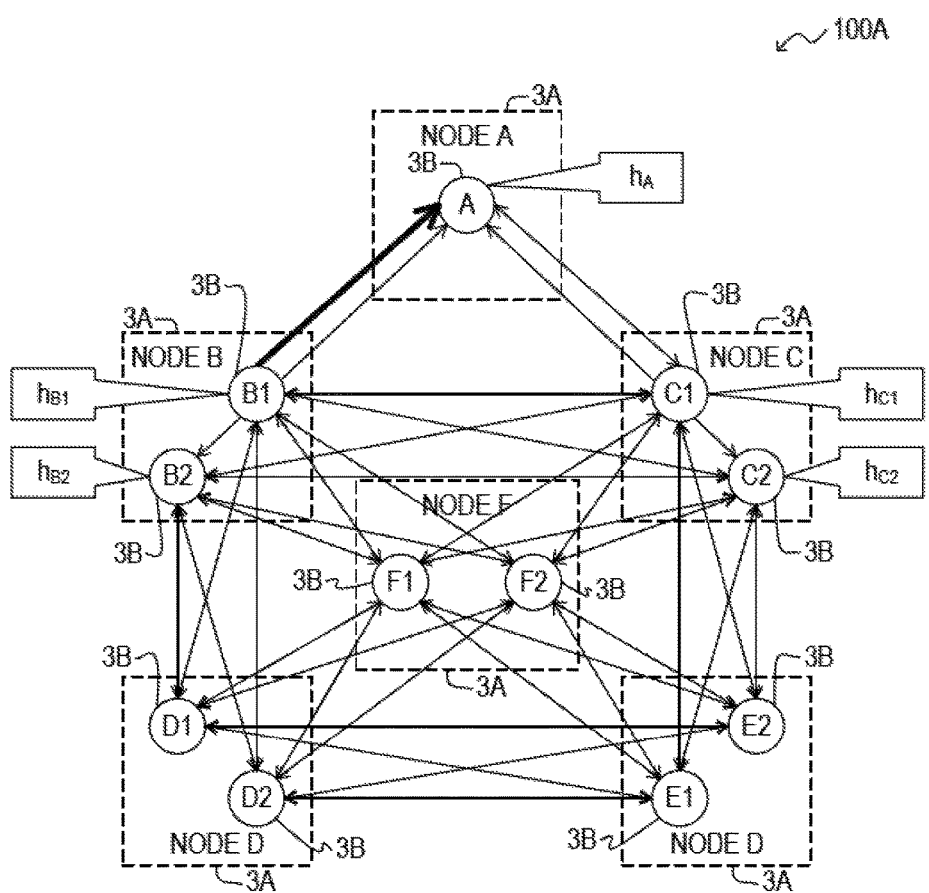
FIG. 24 is a view for explaining an example of a third constraint condition.

For example, as illustrated in FIG. 24, when the edge $e_{B1A}$ from the node B1 to the node A is selected, the passing orders $h_A$ and $h_{B1}$ of the nodes A and B1 are determined to satisfy the conditional equation of $-M \times (1 - e_{B1A}) + h_{B1} - h_A < 0$. It is assumed that M is a sufficiently large number.

When the edge $e_{B1A}$ is selected in the above conditional equation, since the edge $e_{B1A} = 1$ and $-M \times (1 - e_{B1A}) = 0$, $h_{B1}$ and $h_A$ are determined so that the condition of $h_{B1} - h_A < 0$ is established (i.e., the condition of $h_{B1} < h_A$ is satisfied).

When the edge $e_{B1A}$ is not selected, since $-M \times (1 - e_{B1A})$ is a large value with the minus sign, the above conditional equation is invalid for $h_{B1}$ and $h_A$.

In this manner, in the constraint condition 3, unlike the constraint conditions 1 and 2 that give constraints on the node 3B and the edge "e," constraints on the passing order "h" are given. For example, since the conditional equation is a valid conditional equation for the passing order "h" of the node 3B at both ends of a selected edge "e" of all the nodes 3B in the topology information 123, the passing order h is appropriately determined.

The path determination unit 117 may determine a path by calculating the passing order "h" of each node 3B in the topology information 123 by using the mathematical programming method based on the objective function and the constraint conditions 1 to 3 as described above.

Next, an example of the path determination result will be described with reference to FIG. 25.

Figure 25:
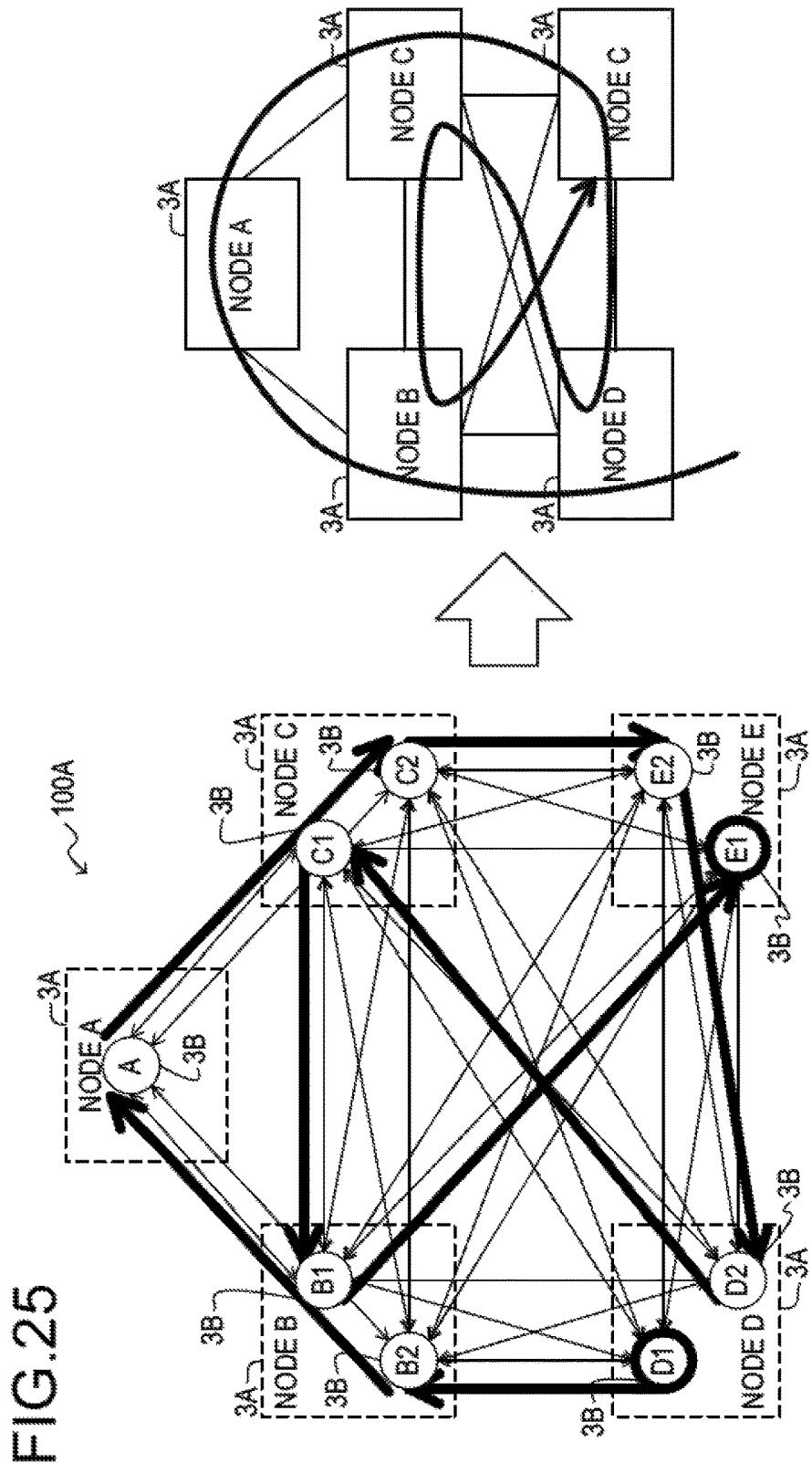
FIG. 25 is a view illustrating an example of a determined path.

As illustrated in FIG. 25, the path determination unit 117 may determine a path passing through all the spans, starting from the node D as a start point, going round the node B→A→C→E→D→C→B→E in a single stroke.

When the calculation of the path is completed, the path determination unit 117 may notify the control device 2 of the obtained path information and may cause the control device 2 to perform optical cross connection setting for each node 3A. Upon detecting the completion of the optical cross connection setting by the control device 2, the path determination unit 117 may instruct the transmission quality amount calculation unit 111 to measure the transmission quality amount using the path information. The measurement of the transmission quality amount may be carried out, for example, by the method according to the above-described first embodiment.

The path determination unit 117 may detect the completion of the optical cross connection setting, for example, upon reception of a completion notification from the control device 2. Alternatively, upon detecting that an optical signal reaches the end point node 3A (for example, the node E)

from the start point node 3A (for example, the node D) via the relay node 3A, the path determination unit 117 may detect the completion of the optical cross connection setting.

As a result, it is possible to measure the transmission quality amount of each transmission path of the entire network by a series of measurement processing. In addition, according to the constraint conditions 1 to 3, it is possible to select a path that does not pass through the overlapping spans, as a path to be measured, from paths that pass through all the spans in the network formed by the plurality of nodes 3A.

As described above, the path determination unit 117 is an example of a determination unit that determines a transmission path of an optical signal passing through all the spans in the network formed by the plurality of nodes 3A, as a target transmission path to acquire an index related to the first transmission performance and an index related to the second transmission performance.

[B-2] Exemplary Operation

A path determination operation and a transmission performance estimation operation in the optical communication system 100A of the second embodiment configured as described above will be described in accordance with a flowchart (Operations P31 to P34 and P1 to P4) illustrated in FIG. 26.

The path determination unit 117 may acquire the network topology information via the control device 2 (Operation P31).

The route determination unit 117 may determine a path based on the acquired topology information (Operation P32). The determination of the path may include conversion of the topology information into the topology information 123 on the node 3B, setting of the objective function and the constraint conditions 1 to 3 based on the topology information 123, and determination of the path order h based on the mathematical programming method.

The path determination unit 117 may determine whether or not there is an unmeasured path for the transmission quality amount (Operation P33). When it is determined that there is an unmeasured path ("Yes" in Operation P33), the path determination unit 117 may set the optical cross connection in the target node 3A of the path via the control device 2 (Operation P34).

When the setting of the optical cross connection is completed, the process may proceed to Operation P1. Operations P1 to P4 may be the same as Operations P1 to P4 exemplified in FIG. 10. For example, Operations P1 to P4 may include operations that the transmission quality amount calculation unit 111 measures the BERs of a plurality of span groups, calculates the transmission quality amount from the measured BERs, calculates the transmission quality amount of a target span, and stores the calculated transmission quality amount of each span in the memory 12A. When Operation P4 is completed, the process may proceed to P33.

Meanwhile, when it is determined in Operation P33 that an unmeasured path does not exist ("No" in Operation P33), the process is ended. In this case, at least one of Operations P5 to P9 illustrated in FIG. 10 may be executed.

[B-3] Modification of the Second Embodiment

Next, a modification of the second embodiment will be described.

In the above-described second embodiment, a method of determining a path passing through all the links in the optical communication system 100A has been described, but a link not passing through all the links may be present depending on the scale of the network.

For example, in the second embodiment, when extracting a single-stroke path, if the network scale is large, the total length of the path is long, which may result in difficulty in correct measurement of the transmission quality amount at the node 3A.

Therefore, in a case where there is a single-stroke path, the path determination unit 117 may fix the start point node 3A and the end point node 3A of the path, divide a link into smaller topologies by reducing the link, and determine a path related to the small network topology. In other words, the path determination unit 117 may separate transmission paths of optical signals passing through all the spans in the network, as a plurality of transmission paths having the same start point node and end point node of a corresponding wavelength path and different spans through which the transmission paths pass. As a result, it is possible to shorten the path and correctly measure the transmission quality amount of the node 3A.

For example, when the number of spans in a requested path is larger than a predetermined threshold, the path determination unit 117 may determine the path to be shortened.

FIG. 27 is a view illustrating an example of a determined path in the modification of the second embodiment.

As one example, as indicated by a solid line in FIG. 27, in a case of a topology in which links between the nodes B and C, between the nodes B and E and between the nodes C and E are deleted, the path determination unit 117 may find a path of the node D→B→A→C→D→E, thereby shortening the total length of the path.

In addition, as indicated by a broken line in FIG. 27, in a case of a topology in which links between the nodes B and A, between the nodes A and C, between the nodes C and D, between the nodes B and E, and between the nodes D and E are deleted, the path determination unit 117 may find a path of the node D→B→C→E, thereby shortening the total length of the path.

Further, as indicated by a dashed line in FIG. 27, in a case of a topology in which links between the nodes B and A, between the nodes B and C, between the nodes A and C, between the nodes C and D, between the nodes C and E, and between the nodes D and E are deleted, the path determination unit 117 may find a path of the node D→B→E, thereby shortening the total length of the path.

For each of the plurality of paths divided into the small network topologies in this manner, the path determination unit 117 may instruct the control device 2 to perform the cross connection setting of the node 3A in turn to cause the transmission quality amount calculation unit 111 to calculate the transmission quality amount of each span.

Figure 26:
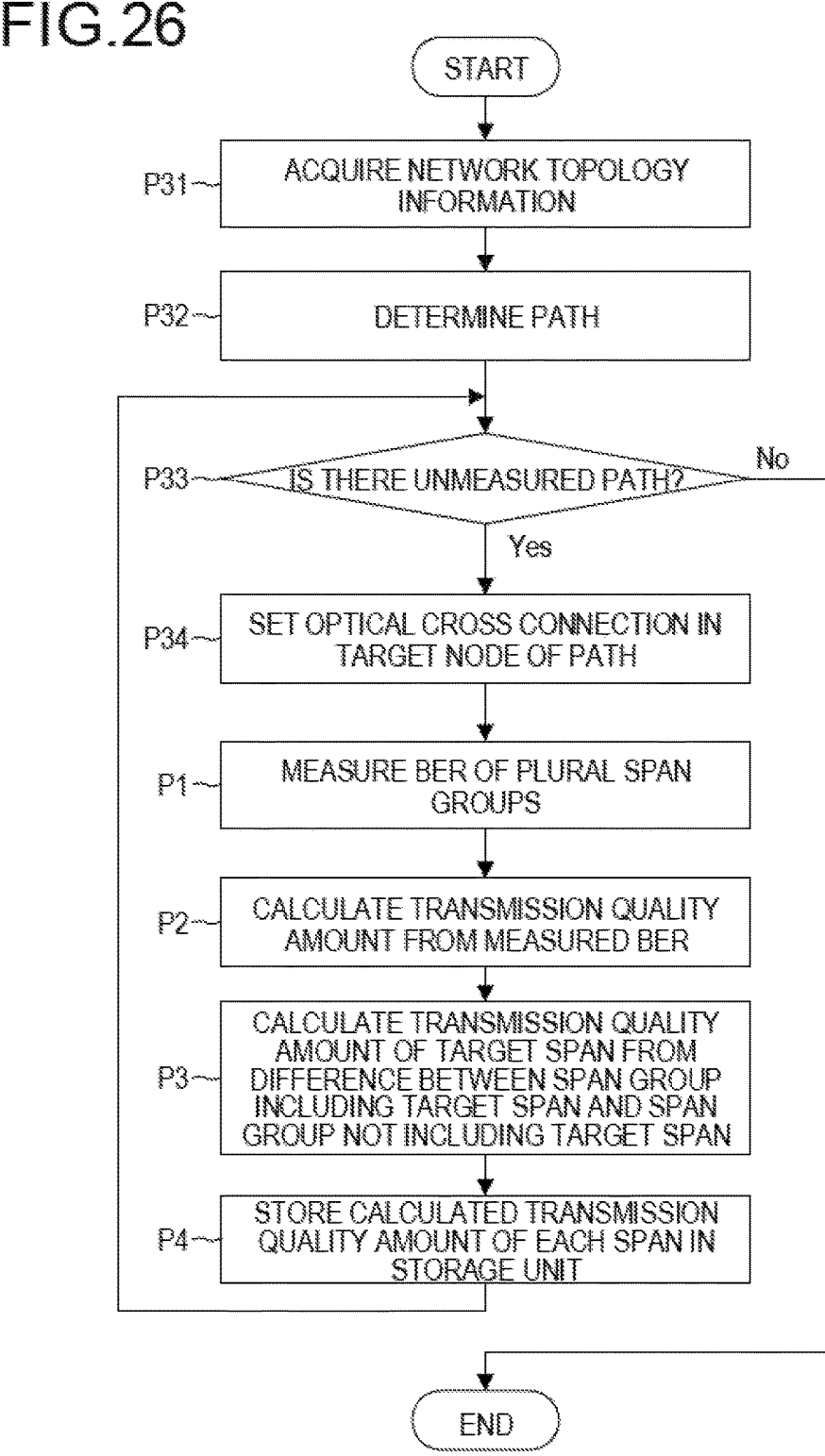
FIG. 26 is a flowchart for explaining a path determination operation and a transmission performance estimation operation in the optical communication system illustrated in FIG. 17.

The process according to the above-described modification of the second embodiment may be executed in Operation P32 of FIG. 26, and a plurality of paths divided into the small network topologies may be selected one by one, as a path to be measured, in Operations P33 and P34. In other words, the transmission quality amount calculation unit 111 may acquire and estimate the transmission quality amount for each of a plurality of separated transmission paths by the same method as in the first embodiment.

[C] Others

The disclosed technique is not limited to the embodiments described above, and various modifications may be made without departing from the spirit and scope of the present disclosure. The constitutions and processes of the embodiments may be selected as required, or may be used in proper combination.

For example, the fifth modification and the sixth modification described above may be used in combination. That is, the transmission quality amount of each span updated in the fifth modification and the deterioration amount of an optical signal generated at the Tx/Rx4 of each node in the sixth modification may be used to calculate the transmission quality amount of a wavelength path.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus configured to estimate optical transmission performance in a transmission path of an optical signal in a network formed by a plurality of nodes, the apparatus comprising:
    a memory; and
    a processor coupled to the memory and the processor configured to:
        acquire a first index related to a first transmission performance of an optical signal transmitted through a span group between a first node and an n-th node and a second index related to a second transmission performance of an optical signal transmitted through a span or a span group between the first node and an m-th node, wherein n is an integer of 3 or more, and m is the integer satisfying m<n, and
        estimate a third index related to a third transmission performance of an optical signal to be transmitted through a span between the m-th node and the n-th node, based on a difference between the first index and the second index.

2. The apparatus according to claim 1,
    wherein the processor is configured to estimate the third index for each span of one or more spans in the network, and
    wherein the processor is further configured to calculate an index related to a transmission performance of an optical signal to be transmitted through a section formed by the one or more spans, based on the estimated third index for the each span of one or more spans.

3. The apparatus according to claim 2,
    wherein the processor is further configured to determine whether an optical signal is able to be transmitted in the section, based on a result of the calculated index related to the transmission performance of the optical signal to be transmitted through the section.

4. The apparatus according to claim 2,
    wherein the processor is configured to estimate a plurality of indexes related to transmission performances for the each span of the one or more spans, and
    wherein the processor is configured to calculate the index related to the transmission performance of the optical signal to be transmitted through the section for the each span of the one or more spans, by using one of the estimated plurality of indexes.

5. The apparatus according to claim 2,
    wherein the processor is configured to calculate the index related to the transmission performance of the optical signal to be transmitted through the section, by using a deterioration amount of an optical signal in each of a start point node and an end point node in the section.

6. The apparatus according to claim 2,
    wherein the processor is configured to calculate the fourth index, by using a noise amount generated in an optical signal in each of a start point node and an end point node in the section.

7. The apparatus according to claim 1,
    wherein the processor is configured to update the third index, based on an actual measured value of an index related to a transmission performance of an optical signal transmitted through the span group between the first node and the n-th node, the first index, and the estimated third index.

8. The apparatus according to claim 1,
    wherein the processor is configured to estimate the third index, when the first index is smaller than a predetermined first threshold, and the second index is greater than a predetermined second threshold.

9. The apparatus according to claim 1,
    wherein the processor is configured to acquire a fourth index related to a fourth transmission performance of an optical signal transmitted through a span group between the first node and an (n+1)-th node, and
    wherein the processor is configured to estimate the third index, when the fourth index is greater than a predetermined third threshold.

10. The apparatus according to claim 1,
    wherein the processor is configured to determine a transmission path of an optical signal to be passed through all spans in the network, the first index and the second index being acquired in the determined transmission path.

11. The apparatus according to claim 10,
    when a number of spans included in the determined transmission path is greater than a predetermined fourth threshold,
    wherein the processor is configured to separate the determined transmission path into a plurality of transmission paths having a common start point node, a common end point node, and different spans, and
    wherein the processor is configured to acquire the first index and the second index and estimate the third index on each of the plurality of separated transmission paths, respectively.

12. A method configured to estimate optical transmission performance in a transmission path of an optical signal in a network formed by a plurality of nodes, the method comprising:
    acquiring a first index related to a first transmission performance of an optical signal transmitted through a span group between a first node and an n-th node and a second index related to a second transmission performance of an optical signal transmitted through a span or a span group between the first node and an m-th node, wherein n is an integer of 3 or more, and m is the integer satisfying m<n; and
    estimating a third index related to a third transmission performance of an optical signal to be transmitted through a span between the m-th node and the n-th node, based on a difference between the first index and the second index, by a processor.

13. The method according to claim 12,
wherein the processor estimates the third index for each span of one or more spans in the network, and
wherein the processor calculates an index related to a transmission performance of an optical signal to be transmitted through a section formed by the one or more spans, based on the estimated third index for the each span of one or more spans.

14. The method according to claim 13,
wherein the processor determines whether an optical signal is able to be transmitted in the section, based on a result of the calculated index related to the transmission performance of the optical signal to be transmitted through the section.

15. The method according to claim 12,
wherein the processor updates the third index, based on an actual measured value of an index related to a transmission performance of an optical signal transmitted through the span group between the first node and the n-th node, the first index, and the estimated third index.

16. The method according to claim 12,
wherein the processor acquires a fourth index related to a fourth transmission performance of an optical signal transmitted through a span group between the first node and an (n+1)-th node, and
wherein the processor estimates the third index, when the fourth index is greater than a predetermined threshold.

17. The method according to claim 12,
wherein the processor determines a transmission path of an optical signal to be passed through all spans in the network, the first index and the second index being acquired in the determined transmission path.

18. The method according to claim 17,
when a number of spans included in the determined transmission path is greater than a predetermined fourth threshold,
wherein the processor separates the determined transmission path into a plurality of transmission paths having a common start point node, a common end point node, and different spans, and
wherein the processor acquires the first index and the second index and estimates the third index on each of the plurality of separated transmission paths, respectively.

* * * * *